United States Patent
Miura et al.

(10) Patent No.: US 9,701,273 B2
(45) Date of Patent: Jul. 11, 2017

(54) AIRBAG DEVICE

(71) Applicant: TOYODA GOSEI CO., LTD., Kiyosu-shi, Aichi-ken (JP)

(72) Inventors: Wataru Miura, Kiyosu (JP); Tsuyoshi Furuno, Kiyosu (JP); Takashi Shigemura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/236,894

(22) Filed: Aug. 15, 2016

(65) Prior Publication Data

US 2017/0080893 A1   Mar. 23, 2017

(30) Foreign Application Priority Data

Sep. 18, 2015   (JP) ................. 2015-185745

(51) Int. Cl.
| | |
|---|---|
| *B60R 21/20* | (2011.01) |
| *B60R 21/2334* | (2011.01) |
| *B60R 21/2165* | (2011.01) |
| *B60R 21/237* | (2006.01) |
| *B60R 21/205* | (2011.01) |
| *B60R 21/201* | (2011.01) |

(52) U.S. Cl.
CPC .......... *B60R 21/2334* (2013.01); *B60R 21/20* (2013.01); *B60R 21/201* (2013.01); *B60R 21/205* (2013.01); *B60R 21/2165* (2013.01); *B60R 21/237* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,957,486 A | * | 9/1999 | Taguchi ................ | B60R 21/231 280/729 |
| 8,297,654 B2 | * | 10/2012 | Lee ....................... | B60R 21/201 280/743.1 |

(Continued)

FOREIGN PATENT DOCUMENTS

| | | |
|---|---|---|
| JP | 2001-287611 A | 10/2001 |
| JP | 2008-273260 A | 11/2008 |

(Continued)

*Primary Examiner* — Nicole Verley
(74) *Attorney, Agent, or Firm* — Posz Law Group, PLC

(57) ABSTRACT

An airbag device includes an airbag deployable out of a housing when fed with inflation gas, a limitation member capable of constraining a part of the airbag from unfolding and deploying, a wrapping member which wraps the airbag for keeping the folded-up configuration, and a flap member capable of covering an abnormally-seated vehicle occupant from the airbag. The limitation member has flexibility and includes a temporal holding section which holds a folded region of the airbag in a releasable fashion, a mounting section by which the limitation member is mounted on the housing and a connecting section connecting the mounting section and the temporal holding section. The temporal holding section includes a holding recess and frees the folded region via an opening of the holding recess when a periphery of the opening is deformed at airbag deployment. The flap member is disposed between the limitation member and the wrapping member.

6 Claims, 27 Drawing Sheets

(56) References Cited

U.S. PATENT DOCUMENTS

| | | | |
|---|---|---|---|
| 8,608,195 B2* | 12/2013 | Yamada | B60R 21/201 280/732 |
| 2002/0020995 A1 | 2/2002 | Abe et al. | |
| 2004/0195808 A1* | 10/2004 | Amamori | B60R 21/201 280/728.2 |
| 2007/0138779 A1* | 6/2007 | Kwon | B60R 21/201 280/743.2 |
| 2008/0277907 A1 | 11/2008 | Sato et al. | |
| 2011/0049850 A1 | 3/2011 | Horikawa et al. | |
| 2011/0088356 A1* | 4/2011 | Lachat | B60R 21/201 53/429 |
| 2013/0001937 A1* | 1/2013 | Yamada | B60R 21/201 280/732 |
| 2015/0115577 A1 | 4/2015 | Miura et al. | |
| 2016/0214563 A1* | 7/2016 | Kunitake | B60R 21/201 |

FOREIGN PATENT DOCUMENTS

| | | |
|---|---|---|
| JP | 2010-158914 A | 7/2010 |
| JP | 2016-026942 A | 2/2016 |

\* cited by examiner

FRONT
↑
↓
REAR

AIRBAG DEVICE

CROSS REFERENCE TO RELATED APPLICATIONS

The Present application claims priority from Japanese Patent Application No. 2015-185745 of Miura et al., filed on Sep. 18, 2015, the entire disclosure of which is incorporated herein by reference.

BACKGROUND OF THE INVENTION

1. Field of the Invention

The present invention relates to an airbag device mountable on a vehicle, and more particularly, relates to an airbag device which is provided with a limitation member that constrains a part of the airbag from unfolding and deploying at airbag deployment.

2. Description of Related Art

JP 2008-272360 A and JP2001-287611 A (especially, FIG. 13) disclose a known airbag device which includes a holding member that constrains (regulates) a part of an airbag from unfolding and deploying and let other part of the airbag be deployed first. In the airbag device, the holding member is configured to temporarily hold opposite end regions (front and rear end regions or left and right end regions) of the airbag which is folded up and housed in a housing such that the opposite end regions are held from unfolding for an instant in an initial stage of airbag deployment and thereafter freed from the holding member and deployed.

In the above specified prior art references, the holding member is a part of a wrapping member which wraps up the airbag for keeping the airbag in a folded-up configuration. The wrapping member is formed into a parallelepiped box having a shape retention property, and opposite end regions of the wrapping member serve as the holding member. Between the holding members at opposite end regions of the wrapping member is an opening which the airbag gets out of at airbag deployment. The holding member constrains the opposite end regions of the airbag from unfolding and deploying until a peripheral region of the opening are deformed in an arcuate fashion and the opposite end regions of the airbag slip out of the holding members.

However, since the holding members itself have a shape retention property and are secured to a part of the airbag device having rigidity, the holding members are not easily deformable and accordingly sometimes fail to release the held regions of the airbag smoothly so the airbag can be deployed quickly.

JP 2010-158914 A discloses an airbag device which includes an airbag in a folded-up configuration and a wrapping member wrapped around the airbag. The airbag device further includes a flap member which is so deployable as to contact with an abnormally-seated vehicle occupant (i.e., a vehicle occupant situated too close to the airbag device, or more specifically, to an airbag housing) at airbag deployment so as to prevent the occupant from contacting the airbag too early in the course of airbag deployment.

However, it is uncertain whether this configuration will help constrain a part of the airbag from unfolding and deploying temporarily in a steady fashion since the flap member is mounted on the wrapping member which is flexible and tearable.

SUMMARY OF THE INVENTION

An object of the present invention is to provide an airbag device which is capable of constraining an airbag from deploying temporarily and freeing it from constraint thereafter smoothly in an initial stage of airbag deployment in order to protect a vehicle occupant in an adequate fashion.

The airbag device of the invention includes an airbag, a wrapping member, a limitation member and a flap member.

The airbag is stored in and held by a housing in a folded-up configuration and is inflatable and deployable out of the housing for protecting a vehicle occupant when fed with an inflation gas.

The wrapping member wraps, in a tearable fashion, a folded-up body, which refers to a folded-up configuration of the airbag, for keeping the folded-up configuration of the airbag.

The limitation member is mounted on the housing for temporarily constraining a part of the airbag from unfolding and deploying at airbag deployment.

The limitation member has flexibility, and is wrapped by the wrapping member together with the airbag and stored in the housing. The limitation member includes a temporal holding section which temporarily holds a folded region of the airbag, which is a part of the airbag, in a releasable fashion, a mounting section which is secured to the housing, and a connecting section that connects the temporal holding section and the mounting section. The temporal holding section of the limitation member includes a base region which is connected with the connecting section, a cover region which is connected with the base region, and a holding recess which is formed between the base region and the cover region so as to lodge the folded region of the airbag temporarily. The holding recess includes an opening out of which the folded region is freed from constraint. The opening is disposed at an inner periphery of an unconnected hem of the cover region which is not connected with the base region.

The flap member is mounted to a vicinity of the housing and is so deployable as to reach a vehicle occupant situated too close to the housing and cover the occupant from the airbag being deployed. The flap member is disposed between the limitation member and the wrapping member inside the housing.

When the airbag device of the invention is actuated, the airbag is fed with an inflation gas and unfolds and inflates. Then the airbag tears the wrapping member and further unfolds and inflates. At this time, initially, an initial inflatable region of the airbag, which is not stored inside the temporal holding section of the limitation member and is closer to the inflation gas source, is unfolded and inflated while the folded region stays held by the temporal holding section. Although the limitation member is fixed to the housing by the mounting section, the temporal holding section of the limitation member will turn along with the behavior of the folded region due to deformation of the connecting section (i.e., due to flexibility of the limitation member) which is disposed between the mounting section and temporal holding section. Then if the folded region of the airbag is pulled by the initial inflatable region which is further unfolded and inflated and is inflated itself, the folded region slips out of the temporal holding section (i.e., out of the holding recess) via the opening which has been widened due to deformation of the unconnected hem of the cover region which forms the periphery of the opening, and is freed from constraint by the temporal holding section. Then the airbag further unfolds and be deployed as a whole.

More specifically, when the folded region of the airbag slips out of the temporal holding section, the opening of the temporal holding section turns due to deformation of the connecting section, and the unconnected hem of the temporal holding section forming the periphery of the opening is also deformed. Accordingly, the folded region is allowed to slip out of the temporal holding section and freed from constraint smoothly, and the whole airbag is also freed from constraint from unfolding and deploying.

Until the folded region is freed from constraint by the temporal holding section, the airbag, especially the initial inflatable region, is constrained from unfolding, deploying, and protruding out of the housing. When the folded region is freed from constraint thereafter, the whole airbag including the initial inflatable region is allowed to complete deployment. Therefore, with the airbag device of the invention, a desired inflated state of the airbag will be attained in an initial stage of airbag deployment.

At the same time, the wrapping member is torn while the initial inflatable region is unfolded and inflated, and the flap member, which has been disposed between the limitation member and the wrapping member, is deployed out of the housing along with the rotation of the temporal holding section.

If, at this time, the vehicle occupant is located too close to the airbag device (i.e., to the housing), the leading end region of the flap member will be brought into contact with the occupant and cover the occupant, and redirect the course of deployment of the airbag upward or the like, such that a pressure, which would otherwise be given to the abnormally-seated occupant, will be reduced and the abnormally-seated occupant will be protected in an adequate fashion. If the occupant is seated at a normal position, the leading end region of the flap member will complete deployment without contacting the occupant, and the airbag will also be inflated and deployed smoothly without being constrained by the flap member, although the airbag will be subjected to constraint by the limitation member. Therefore, the normally-seated occupant will be protected in a suitable fashion.

Therefore, the airbag device of the present invention is capable of constraining the airbag from deploying temporarily and freeing it from constraint thereafter smoothly to attain a desired inflated state of the airbag in an initial stage of airbag deployment, and is capable of protecting both the abnormally-seated occupant and normally-seated occupant in an adequate fashion.

The configuration of the present invention is different from such a configuration that a limitation member is jointed to an outer circumferential wall of the airbag and constrains the deployment of the airbag until the limitation member is torn when a predetermined tension force is applied to the limitation member. Therefore, in the configuration of the invention, a connecting strength between the limitation member and the outer circumferential wall of the airbag does not have to be considered, and a predetermined folded region of the airbag has only to be stored inside the holding recess of the temporal holding section. That is, the configuration of the invention will help constrain a predetermined region of the airbag from unfolding and deploying easily.

In the airbag device of the invention, it is desired that the flap member is mounted on the housing through the medium of the limitation member or the wrapping member by being joined to the limitation member or the wrapping member by a mounting region of the flap member.

This configuration will help simplify the assembling of the airbag device since the flap member does not have to be mounted on the housing directly.

In the airbag device of the invention, it is also desired that:
the folded-up body is held by the housing on the bottom surface;
the folded region of the airbag held by the limitation member temporarily is disposed in a vicinity of a top surface of the folded-up body;
the mounting section of the limitation member is disposed on the bottom surface of the folded-up body;
the connecting section of the limitation member is disposed on a side of the folded-up body;
the temporal holding section of the limitation member is disposed in such a manner that the base region is disposed in a vicinity of the top surface of the folded-up body while the cover region is disposed closer to the bottom surface of the folded-up body than the base region;
the flap member includes a severalfold region which is formed by folding a leading end region of the flap member, which is deployable towards the vehicle occupant, in layers; and
a length of the flap member between a mounting region thereof to the vicinity of the housing and a root region of the severalfold region is longer than a length of the limitation member between the mounting section and a leading end of the temporal holding section such that the root region of the severalfold region is dislocated outward of the leading end of the temporal holding section and is allowed to move at airbag deployment.

In the airbag folded up and assembled with the limitation member and flap member as described above, the temporal holding section is bent from the connecting section of the limitation member and arranged in parallel to the bottom surface of the folded-up body. With this configuration, in order that the folded region of the airbag slips out of the opening of the temporal holding section at airbag deployment, the temporal holding section has to rotate in such a manner as to draw away from the bottom wall of the housing by deforming the connecting section and then the unconnected hem of the cover region has to be deformed to enlarge the opening of the temporal holding section. That is, during this behavior of the temporal holding section, the airbag will keep constrained from unfolding and inflating. Once the opening is then enlarged enough to release the folded region, the airbag will be deployed quickly as a whole.

Further, since the length of the flap member is predetermined as described above, the severalfold region of the flap member will be unfolded and deployed smoothly on an outside of a rotational trajectory of the leading end of the temporal holding section. That is, the configuration of the invention is not likely to cause such an undesirable situation that the flap member would be stuck between the temporal holding section and a member of vehicle disposed around the housing and fail to be deployed towards the vehicle seat, but will help attain a steady deployment of the flap member.

It is further desired, in the above configuration, that:
the connecting section of the limitation member is disposed on the side of the folded-up body facing towards a deployment direction of the airbag;
the wrapping member includes, in a vicinity of a center of a top section thereof disposed over the top surface of the folded-up body, a tearable region that is formed along a width direction of the connecting section of the limitation member and is tearable at airbag deployment;
the flap member is mounted on the housing through the medium of the limitation member or the wrapping member by being joined to the limitation member or the wrapping member by the mounting region of the flap member;

the flap member is joined to the limitation member or the wrapping member at an area disposed towards the connecting section of the limitation member with respect to the tearable region of the wrapping member, on the top surface of the folded-up body; and the severalfold region of the flap member is disposed on an opposite side of the mounting region with respect to the tearable region on the top surface of the folded-up body.

With the above configuration, the length of the flap member can be controlled depending on a mounting position on the top surface of the folded-up body, and therefore, can be as short as possible. Further, the flap member is disposed over (or straddle) the tearable region of the wrapping member. With this configuration, when the airbag is going to emerge out of the housing due to tearing of the tearable region, the severalfold region of the flap member will be pushed by the airbag and pulled towards the mounting region while staying on the opposite side of the mounting region with respect to the tearable region. That is, the severalfold region will be pulled towards opposite directions, i.e., towards the mounting region and towards the opposite direction, thus unfold towards both directions, and then rotate towards the vehicle seat on an outside of the rotational trajectory of the temporal holding section, without being constrained by the temporal holding section. As a consequence, in an initial stage of airbag deployment, the severalfold region (i.e., the leading end region) of the flap member will quickly unfold on the outside of the airbag and temporal holding section, and be turned towards the vehicle seat in an unfolded state. If, at this time, the occupant is seated in an abnormal fashion, the flap member will contact and cover the occupant. Even if the flap member is long and the severalfold region is formed in many layers, the configuration of the invention will help unfold the severalfold region smoothly for covering the abnormally-seated occupant.

In the airbag device of the invention, the limitation member may further include a pair of limitation arms that extend from opposite edges of the temporal holding section in such a manner that the connecting section is disposed between the limitation arms, and are jointed to the housing for constraining the folded region of the airbag from unfolding and deploying in an initial stage of airbag deployment.

Such limitation arms will constrain the opening of the temporal holding section from turning and thus constrain the airbag from unfolding and deploying, without hindering the unconnected hem of the temporal holding section, which is opposed to the base region, from being deformed, that is, without hindering the unfolding of the folded region. Therefore, the limitation arms will be suitable for an instance where a stronger constraint of airbag deployment is desired.

If the airbag device of the invention is mounted inside a top plane of an instrument panel disposed below a windshield, it is desired that the folded region of the airbag which is temporarily held by the temporal holding section of the limitation member is a part of a rear region of the airbag.

With this configuration, at airbag deployment, the constraint by the temporal holding section of the limitation member will delay the deployment of the rear region of the folded-up body, and accordingly delay the deployment of a front region of the folded-up body as well. In an airbag device for a front passenger seat, the front region of the folded-up body is usually a region to be deployed towards the windshield in an initial stage of airbag deployment. That is, the above configuration will help prevent the region from hitting the windshield forcefully in an initial stage of airbag deployment.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
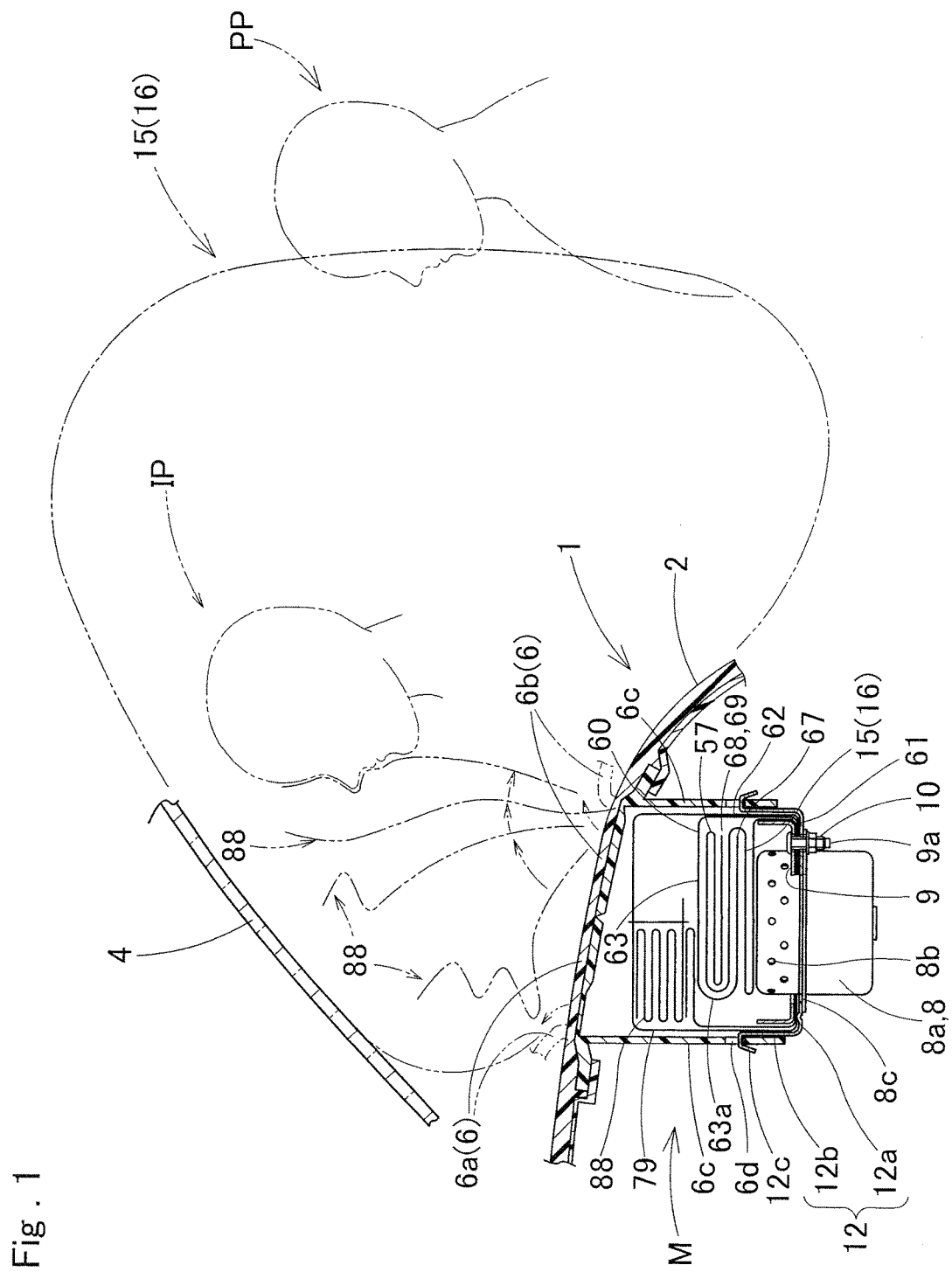
FIG. 1 is a schematic vertical section of an airbag device for a front passenger seat embodying the invention, as mounted on a vehicle.

In the following specification, an airbag device M for a front passenger seat mountable in front of a front passenger seat will be described as an embodiment of the invention. As shown in FIG. 1, the airbag device M for a front passenger seat is a top-mount airbag device which is stored inside the top plane 2 of the instrument panel or dashboard 1 disposed below the windshield 4.

As shown in FIGS. 1 and 13, the airbag device M includes an airbag 15, which is folded up, an inflator 8 for supplying the airbag 15 with an inflation gas, a case (i.e., a housing) 12 for housing and holding the airbag 15 and inflator 8, a retainer 9 for attaching the airbag 15 and inflator 8 to the case 12, and an airbag cover 6 for covering the airbag 15. Hereinafter the airbag 15 in a folded-up configuration is referred to as a "folded-up body 53". The airbag device M further includes a limitation member 60 which constrains the airbag 15 from unfolding and deploying, a wrapping member 79 which wraps the folded-up body 53 for keeping the folded-up configuration, and a flap member 88 which protects an abnormally-seated vehicle passenger or occupant (i.e., a vehicle passenger or occupant situated too close to the airbag device M or more specifically, too close to the case 12 of the airbag 15) IP.

The airbag cover 6 is integral with the dashboard 1 made from synthetic resin and includes two doors, i.e. front and rear doors 6a and 6b designed to open when pushed by the airbag 15 upon airbag deployment. The airbag cover 6 further includes around the doors 6a and 6b a joint wall 6c, which is coupled to the case 12. The joint wall 6c is provided with a retaining hole 6d engageable with a later-described retaining hook 12c of the case 12.

The inflator 8 includes a body portion 8a which has a generally pot-like shape and is provided with gas discharge ports 8b, and a flange 8c for attachment to the case 12.

The case (i.e., housing) 12 is made of sheet metal into a generally rectangular parallelepiped, and has a generally rectangular opening on top. The case 12 includes a bottom wall 12a of a generally rectangular plate shape and a circumferential wall 12b extending upward from the outer edge of the bottom wall 12a. The inflator 8 is set in from the lower side of the bottom wall 12a and attached thereto. The circumferential wall 12b is provided, at the upper end, with a plurality of retaining hooks 12c which are inserted into the retaining holes 6d of the joint wall 6c of the airbag cover 6, such that the case 12 and the airbag cover 6 are assembled together.

In the illustrated embodiment, the airbag 15 and the inflator 8 are secured to the case 12 with the aid of the retainer 9, which is located inside the airbag 15. Bolts 9a of the retainer 9 are put through a later-described mounting region 18 of the airbag 15 (which is a peripheral area of a later-described gas inlet port 19 of the airbag 15), the limitation member 60, the wrapping member 79, the bottom wall 12a of the case 12 and the flange 8c of the inflator 8, and then fastened with nuts 10. Thus the airbag 15 and the inflator 8 are secured to the case 12. The bottom wall 12a of the case 12 is also provided with a bracket (not shown) to be jointed to the vehicle body structure.

As described later, the flap member 88 is joined to a rear region 80a of a later-described top section 80 of the wrapping member 79 by sewing. Therefore, the flap member 88 is mounted on the bottom wall 12a of the case 12 through the medium of the wrapping member 79.

Figure 2:
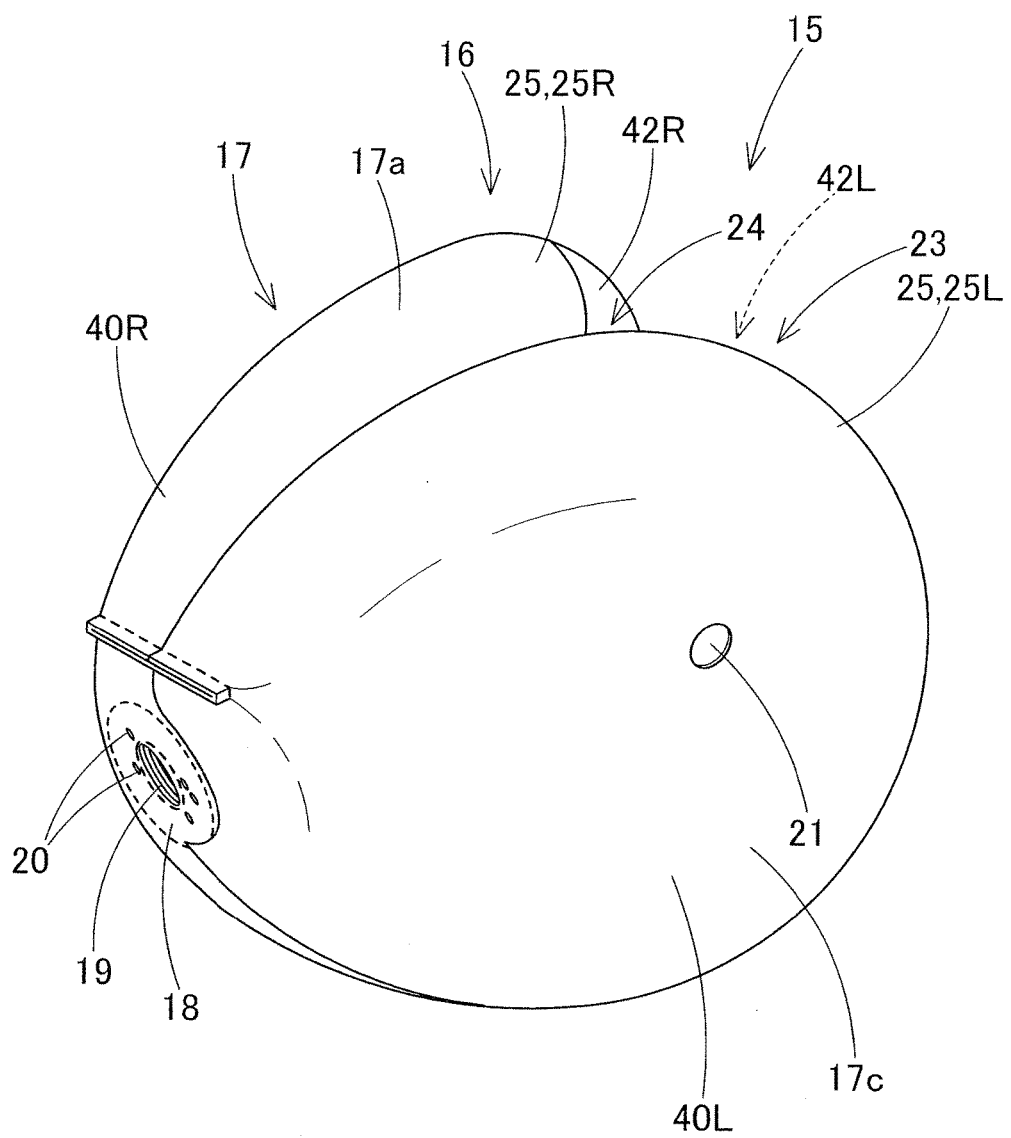
FIG. 2 is a front perspective view of an airbag for use in the airbag device of FIG. 1 as inflated by itself.
Figure 3:
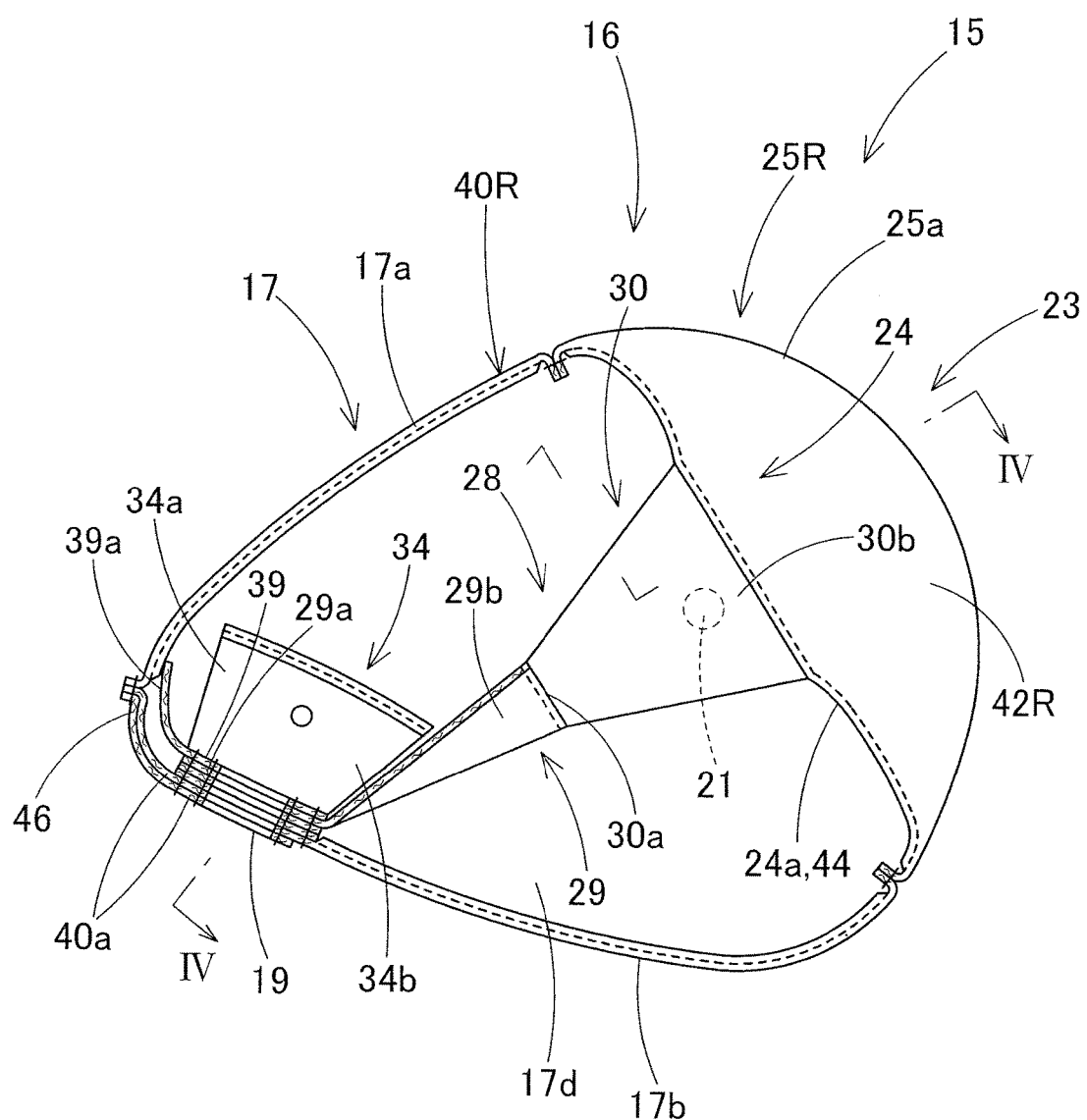
FIG. 3 is a vertical section of the airbag of FIG. 2 taken along a front and rear direction.
Figure 4:
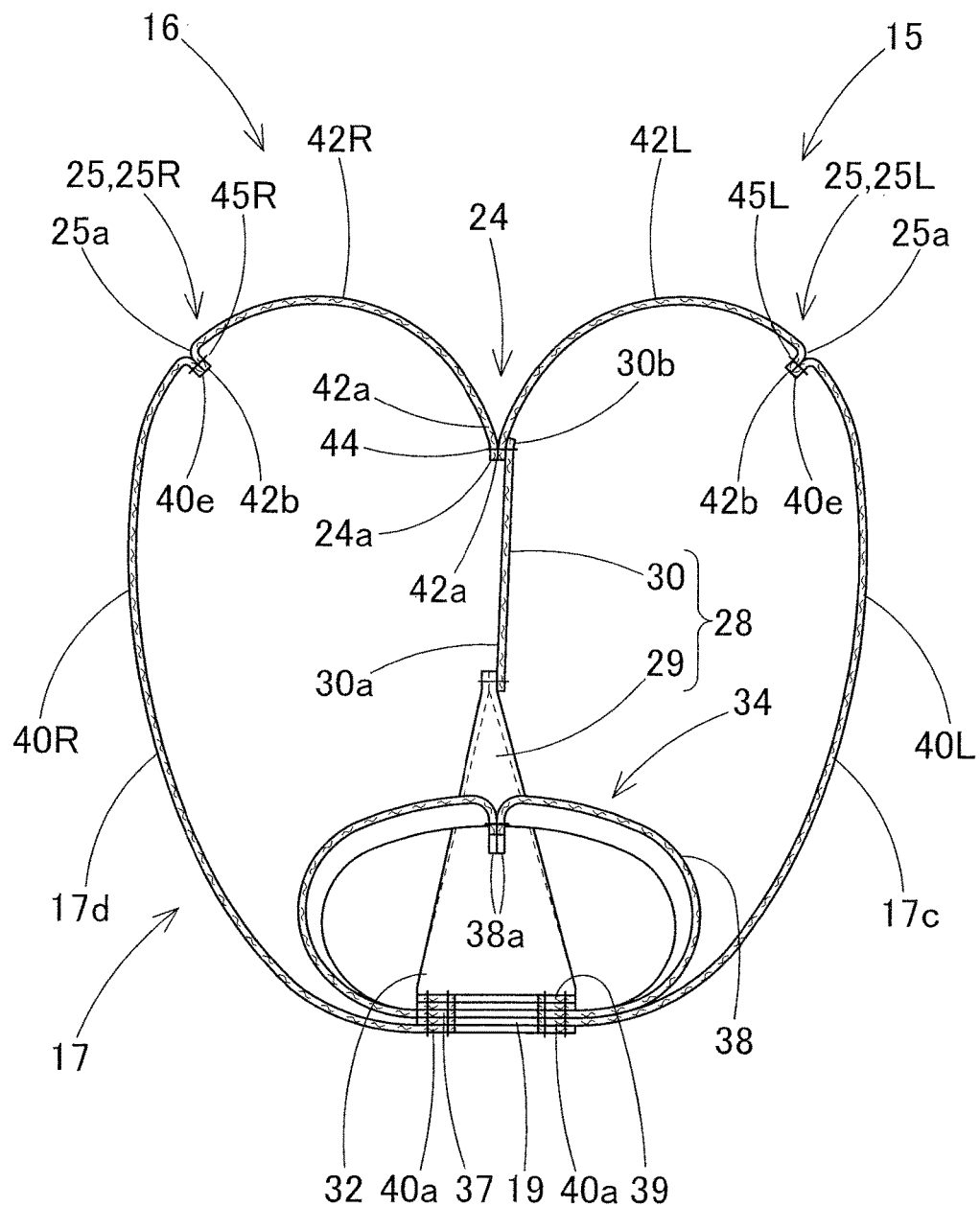
FIG. 4 is a schematic cross-section of the airbag of FIG. 2 taken along line IV-IV of FIG. 2.

Referring to FIGS. 2 to 4, the airbag 15 includes a bag body 16 which is inflatable with an inflation gas, a tether 28 which is located inside the bag body 16 for controlling the shape of the bag body 16 as inflated and a redirecting cloth 34 which redirects the inflation gas having flown into the bag body 16.

As indicated by double-dotted lines in FIG. 1, the bag body 16 is designed to inflate into such a shape that fills up a space between the top plane 2 of the dashboard 1 and the windshield 4. More specifically, as shown in FIGS. 2 to 4, the bag body 16 is designed to inflate generally into a square cone whose top is at the front end of the bag body 16, and includes a passenger side wall 23 deployable towards a passenger and a circumferential wall 17 extending forward from the peripheral edge of the passenger side wall 23 while tapering towards the front end.

The circumferential wall 17 is so deployable as to fill up a space between the top plane 2 of the dashboard 1 and the windshield 4, and includes an upper side wall 17a and a lower side wall 17b extending generally along a left and right direction on the upper and lower sides and a left side wall 17c and a right side wall 17d extending generally along a front and rear direction on the left and right sides. A generally round gas inlet port 19 is formed, for introducing an inflation gas, proximate the front end of and at the center in a left and right direction of the lower side wall 17b, which location being proximate to the front end of the bag body 16 at full deployment. The peripheral region of the inlet port 19 serves as a mounting region 18 by which the airbag 15 is mounted on the bottom wall 12a of the case 12. The mounting region 18 is provided with a plurality of (four, in this embodiment) mounting holes 20 for receiving the bolts 9a of the retainer 9. Each of the left side wall 17c and right side wall 17d is provided with a vent hole 21 for releasing an extra inflation gas.

The passenger side wall 23 is deployable generally vertically at the rear end of the bag body 16 in such a manner as to face towards a front passenger seat. The passenger side wall 23 as inflated includes a recessed area 24 that is sunken forward and extends generally vertically generally at the center in a left and right direction. On the left and right sides of the recessed area 24 are raised regions 25 (25L and 25R) that protrude rearward relative to the recessed area 24. That is, at full airbag inflation, the recessed area 24, which is sunken at the center in a left and right direction, and the raised regions 25L and 25R, which are located on the left and right sides of the recessed area 24, extend continuously along an up and down direction of the passenger side wall 23 of the bag body 16 (FIGS. 3 and 4). In the illustrated embodiment, this unevenness created by the recessed area 24 and raised regions 25L and 25R is greatest at the central region in an up and direction of the passenger side wall 23, and converges toward the lower end of the passenger side wall 23 and the front region of the upper side wall 17a (FIGS. 3 and 4). In the illustrated embodiment, an inner seam 44 that sews inner circumferential edges 42a of a later-described inner left panel 42L and an inner right panel 42R together forms the bottom (or front end 24a) of the recessed area 24 whereas outer seams 45L and 45R that respectively sew together each of rear edges 40e of later-described outer left panel 40L and outer right panel 40R and each of outer circumferential edges 42b of the inner left panel 42L and inner right panel 42R form tops 25a of the raised regions 25L and 25R (FIGS. 3 and 4).

The tether 28 is located inside the bag body 16 in order to pull the bottom (or front end 24a) of the recessed area 24 forward at airbag deployment. As shown in FIGS. 3 and 4, the tether 28 of this embodiment is composed of a front section 29 deployable toward the circumferential wall 17 and a rear section 30 deployable toward the passenger side wall 23.

The front section 29 of the illustrated embodiment is made by folding a part of a base member 32 shown in FIG.

5, and is formed into a bilaterally symmetrical shape relative to the gas inlet port 19. As shown in FIGS. 3 and 4, at airbag deployment, it takes such a three-dimensional shape that the front end region extends generally along a left and right direction whereas the rear end region is similar to a generally triangular cone extending generally along an up and down direction. The front section 29 is jointed to the mounting region 18 of the lower side wall 17b of the bag body 16 by the front end 29a region. The region of the front section 29 extending rearward from the mounting region 18 is generally doubled to form a generally triangular cone. The rear end 29a of the front section 29 is sewn to the front end 30a region of the rear section 30.

The rear section 30 is generally trapezoidal in outer contour. As shown in FIG. 3, the rear end 30b region, which is greater in width, is jointed to the bottom (or front end 24a) of the recessed area 24 at a generally center in an up and down direction of the passenger side wall 23, while the front end 30a region, which is smaller in width, is sewn to the rear end 29b region of the front section 29.

As shown in FIGS. 3 and 4, the redirecting cloth 34 located inside the bag body 16 is disposed over the gas inlet port 19 for redirecting an inflation gas having flown into the bag body 16 via the inlet port 19 towards the front and rear. The redirecting cloth 34 is formed into a generally tube open at the front and rear ends. That is, the inflation gas flows out of the front and rear openings 34a and 34b of the redirecting cloth 34 into the bag body 16, along a front and rear direction. In the illustrated embodiment, the redirecting cloth 34 is composed of a pair of base members 36 shown in FIG. 5. The base members 36 have an identical outer contour, and each has a joint region 37 which is sewn to the periphery of the gas inlet port 19 and a main body 38 extending outwardly in a left and right direction from the joint region 37. The redirecting cloth 34 is formed by joining or sewing the joint regions 37 to the mounting region 18 of the bag body 16 (i.e., to the periphery of the inlet port 19) and sewing the leading ends 38a of the main bodies 38 together.

Figure 5:
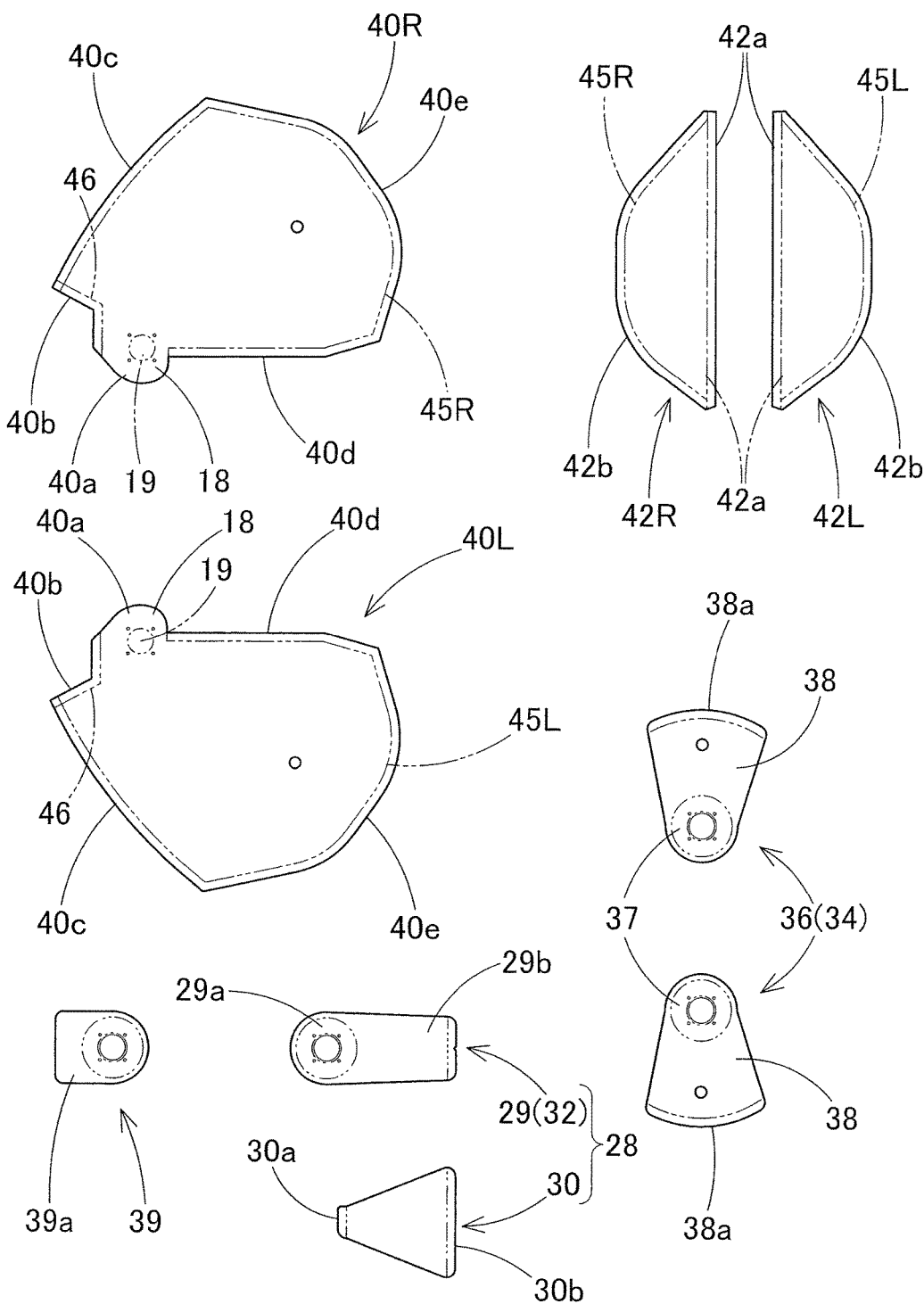
FIG. 5 depicts base members of the airbag of FIG. 2 by plan views.

The bag body 16 is formed by sewing together circumferential edges of predetermined shaped base cloths. As shown in FIG. 5, the bag body 16 of the illustrated embodiment is composed of four base cloths; an outer left panel 40L and an outer right panel 40R, which are deployable on outer sides in a left and right direction, and an inner left panel 42L and an inner right panel 42R, which are deployable on an inner side in a left and right direction.

Referring to FIG. 5, the outer left panel 40L and outer right panel 40R have an identical contour, and constitute the circumferential wall 17 and regions of the passenger side wall 23 on the outside in a left and right direction of the tops 25a of the raised regions 25L and 25R. The outer left panel 40L and outer right panel 40R each form the left/right half of the above-described region split in half by a plane passing through the center of the gas inlet port 19 and extending along a front and rear direction. Each of the outer left panel 40L and outer right panel 40R includes a projecting region 40a for forming the mounting region 18.

The inner left panel 42L and inner right panel 42R constitute an inner region of the passenger side wall 23 disposed between the tops 25a of the raised regions 25L and 25R. Specifically, the inner left panel 42L and inner right panel 42R each form a left/right half of the inner region split in half at the bottom (or front end 24a) of the recessed area 24.

The bag body 16 is further provided with a reinforcing cloth 39 for reinforcing the peripheral area of the gas inlet port 19. The reinforcing cloth 39 includes an extended region 39a which extends forward from the gas inlet port 19. As shown in FIG. 3, the extended region 39a covers a later-described front seam 46 on the inner side at airbag deployment and prevents an inflation gas fed from the gas inlet port 19 from hitting the front seam 46 directly.

In the illustrated embodiment, the outer left panel 40L, the outer right panel 40R, the inner left panel 42L, the inner right panel 42R, the reinforcing cloth 39, the base members 36 to form the redirecting cloth 34, the base member 32 to form the front section 29 of the tether 28 and the rear section 30 of the tether 28 are made of flexible woven fabric of polyester yarn, polyamide yarn or the like. In the illustrated embodiment, these members are not coated with such coating agents as silicone.

Manufacturing of the airbag 15 is now described. Firstly, the inner left panel 42L and inner right panel 42R are overlaid one above the other with the circumferential edges mated, and the inner circumferential edges 42a, together with the rear section 30 of the tether 30, are sewn together with sewing threads, thereby forming the inner seam 44. The outer left panel 40L and outer right panel 40R are overlaid one above the other with the circumferential edges mated, and are sewn together by the lower edges 40d. Then the outer left panel 40L and outer right panel 40R are opened such that the projecting regions 40a overlap each other. Subsequently, the base members 36 of the redirecting cloth 34, the base member 32 of the front section 29 of the tether 28, and the reinforcing cloth 39 are laid on the projecting regions 40a in this order and sewn to the region of the projecting regions 40a to form the mounting region 18 with sewing threads. Then the gas inlet port 19 and the mounting holes 20 are punched out. Thereafter, the outer left panel 40L and outer right panel 40R are overlaid one above the other with the circumferential edges mated again, and are sewn together by the upper edges 40c with sewing threads. Subsequently, the outer left panel 40L and outer right panel 40R are opened such that the rear edges 40e are separated from each other, and the rear edge 40e of the outer left panel 40L and the outer circumferential edge 42b of the inner left panel 42L are sewn together with sewing threads to form the outer seam 45L, while the rear edge 40e of the outer right panel 40R and the outer circumferential edge 42b of the inner right panel 42R are sewn together with sewing threads to form the outer seam 45R. Subsequently, the front edge 30a of the rear section 30 of the tether 28 is sewn to the rear edge 29b of the front section 29 in a doubled state, thus forming the tether 28. Then the bag body 16 is reversed inside out via an unsewn region at the front edges 40b of the outer left panel 40L and outer right panel 40R such that seam allowances may not appear outside. Each of the front edges 40b of the outer left panel 40L and outer right panel 40R is doubled (as shown in FIG. 2) and closed with sewing threads, thus forming the front seam 46. Then the main bodies 38 of the base members 36 of the redirecting cloth 34 are taken out of the gas inlet port 19 and sewn up by the leading ends 38a with sewing threads to form the redirecting cloth 34. Then if the redirecting cloth 34 is put back into the bag body 16, the airbag 15 is completed.

The folding process of the airbag 15 is now described. Firstly, the retainer 9 is housed inside the airbag 15 such that the bolts 9a project out of the mounting holes 20. The airbag 15 is folded up through a preparatory folding step, a left-right contraction step to reduce the dimension in a left and right direction, and a front-rear contraction step to reduce the dimension in a front and rear direction.

Figure 9A:
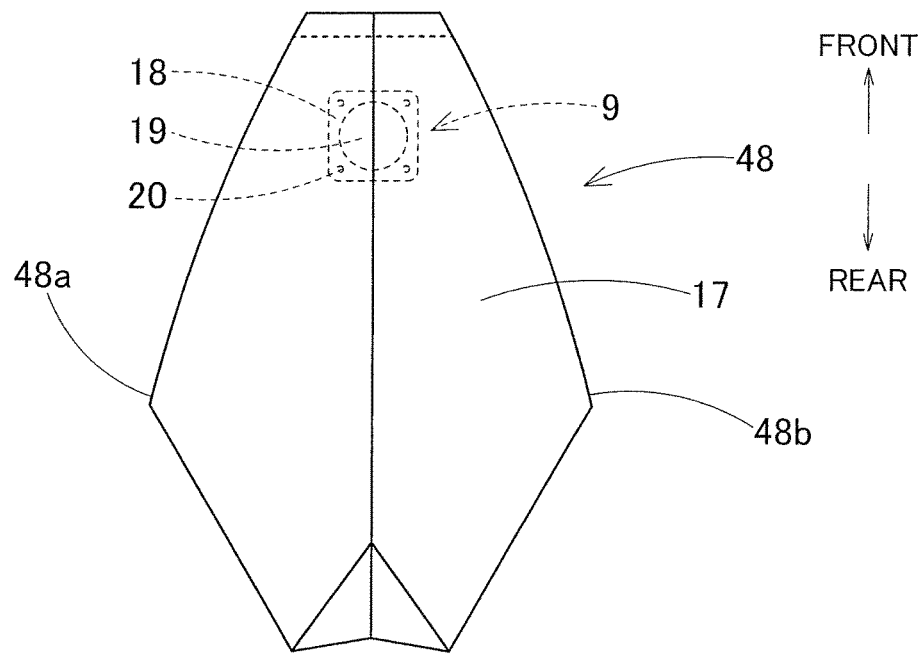
FIGS. 9A, 9B, 10A and 10B illustrate the folding process of the airbag.
Figure 9B:
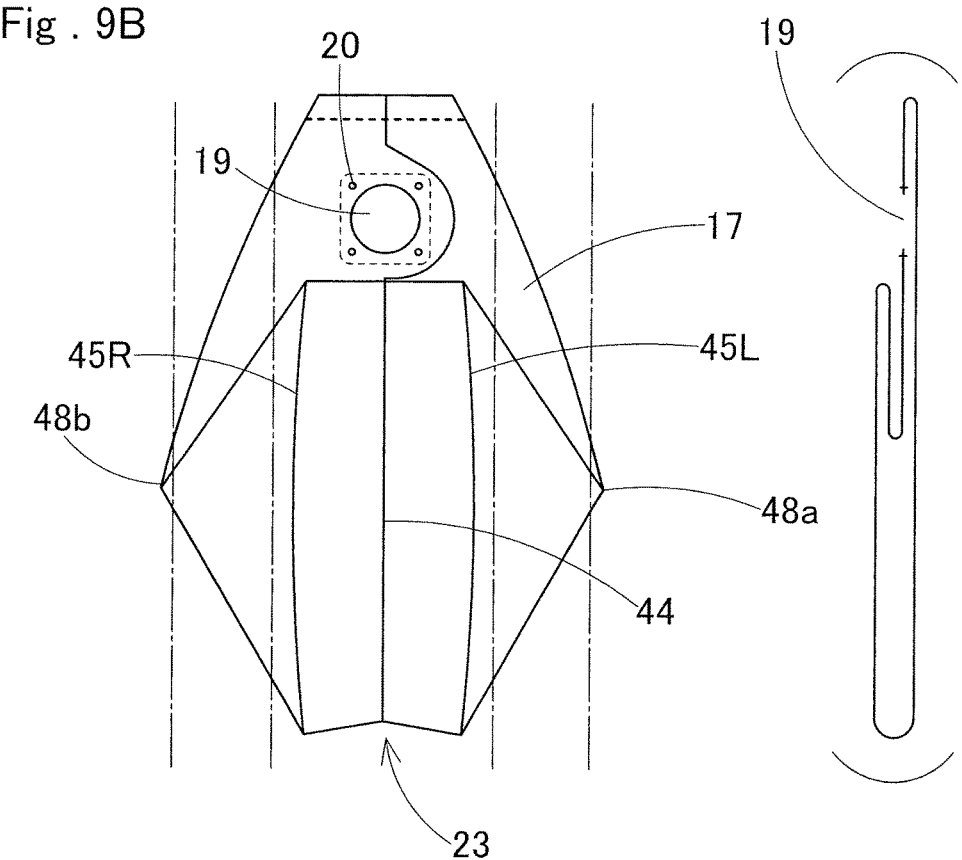

As shown in FIGS. 9A and 9B, in the preparatory folding step, the bag body 16 is folded into a preparatorily folded airbag (or a flattened body) 48. Specifically, in the preparatorily folded airbag 48, the passenger side wall 23 is unfolded in a flat fashion and is located at the rear of the gas inlet port 19 by folding the circumferential wall 17 in a flat fashion and opening the outer seams 45L and 45R towards the left and right with respect to the inner seam 44 and then placing the flat passenger side wall 23 on the circumferential wall 17.

Figure 10A:
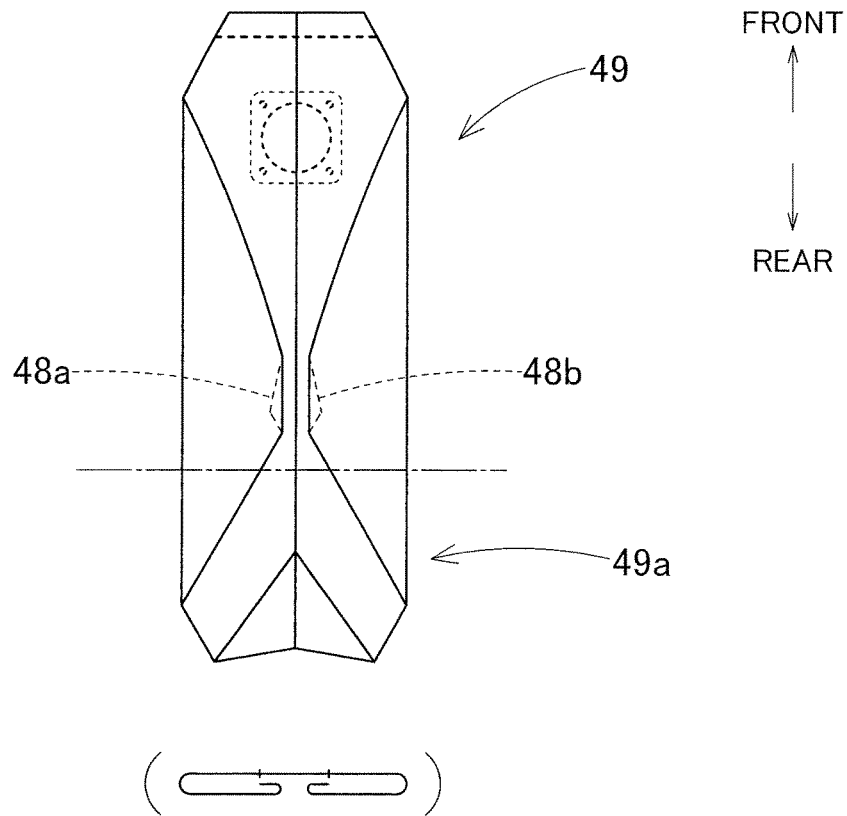

Then in the left-right contraction step, in order to reduce the dimension of the preparatorily folded airbag 48 in a left and right direction, each of the left and right edges 48a and 48b of the preparatorily folded airbag 48 is rolled on the circumferential wall 17 towards the gas inlet port 19, as shown in FIGS. 9B and 10A. Thus, a left-right contracted airbag 49 is provided.

Figure 10B:
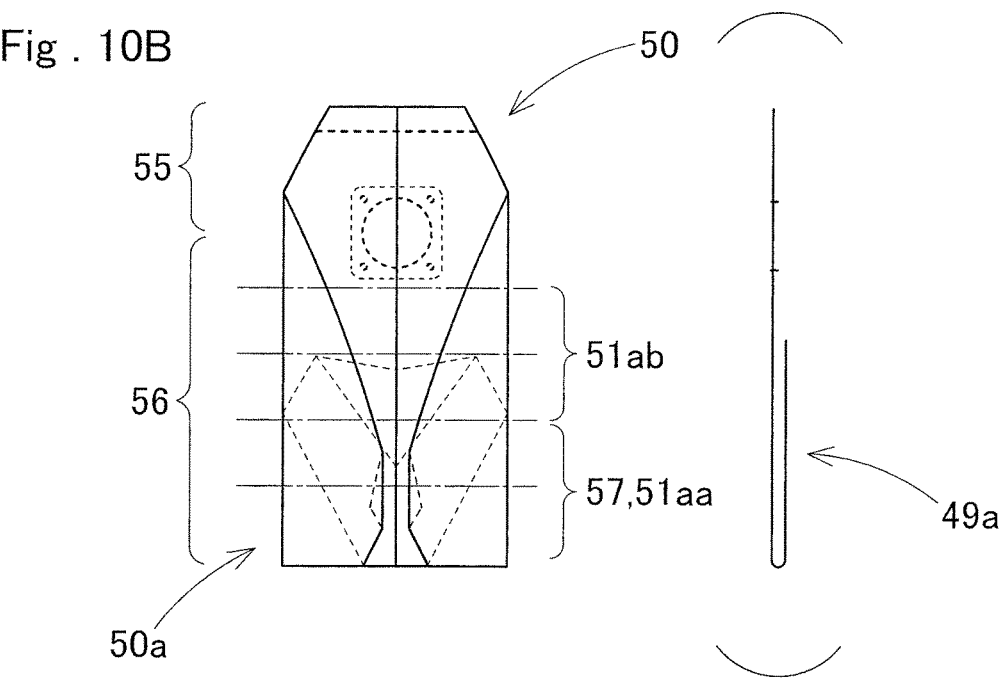

Subsequently, in order to reduce the dimension of the left-right contracted airbag 49 in a front and rear direction, the rear region 49a of the left-right contracted airbag 49, which is disposed at the rear of the gas inlet port 19, is folded back towards the gas inlet port 19 as shown in FIGS. 10B. Thus, a front-rear contracted airbag 50 is provided.

Figure 11A:
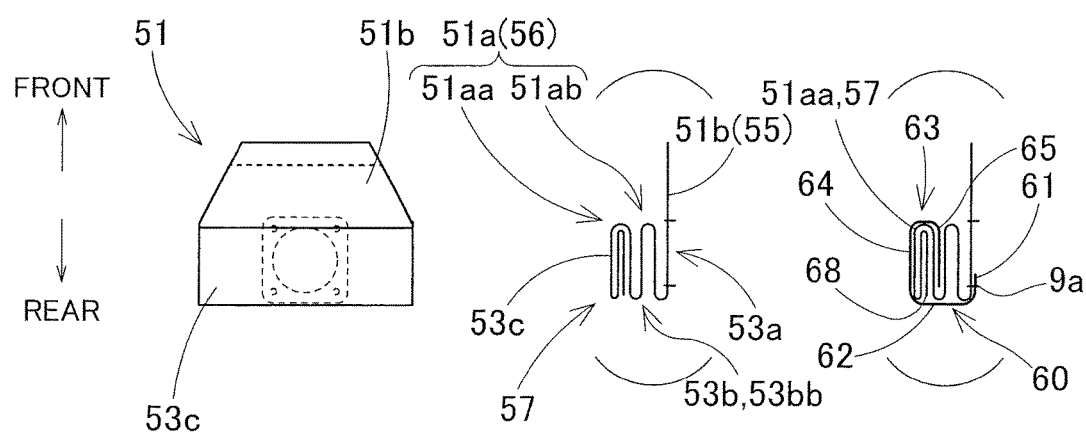
FIGS. 11A and 11B illustrate the airbag assembled with the limitation member as well as a part of the folding process of the airbag following FIG. 10B.

The rear region 50a of the front-rear contracted airbag 50 is then folded in a bellows fashion in order to further reduce the dimension in a front and rear direction, and is placed on the back side of the gas inlet port 19, as shown in FIGS. 10B and 11A. Thus, a second front-rear contracted airbag 51 is provided.

Figure 11B:
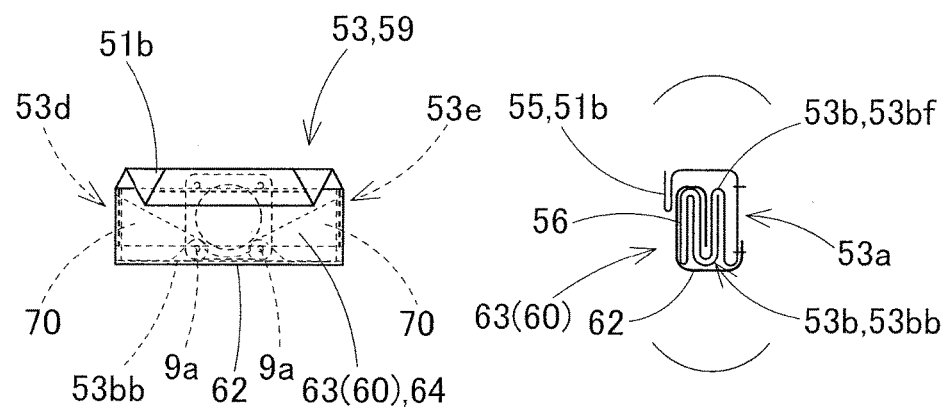

Thereafter, the front region 51b (FIG. 11A) of the second front-rear contracted airbag 51, which is disposed in front of the gas inlet port 19, is turned over over the bellows-folded region 51a which has been folded in a bellows fashion, as shown in FIG. 11B. The folding of the airbag 15 is thus completed, and a folded-up body 53 is provided. The folded-up body 53 is a generally parallelepiped elongated in a left and right direction.

Figure 6:
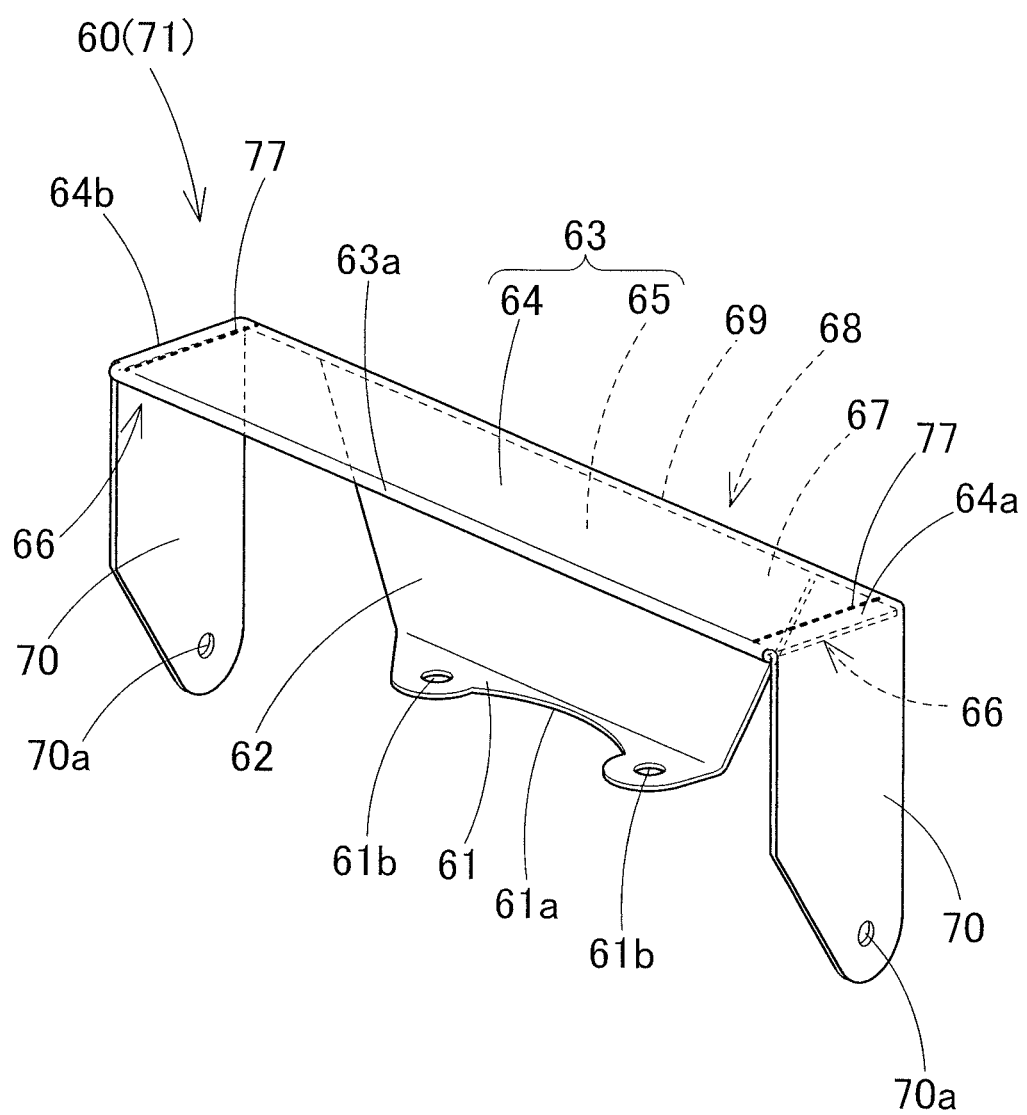
FIG. 6 is a perspective view of a limitation member for use in the airbag device of FIG. 1.

The limitation member 60 is designed to constrain the airbag 15 from unfolding and deploying in an initial stage of airbag deployment such that the airbag 15 is inflated in a predetermined state. As shown in FIGS. 1, 6 and 11, the limitation member 60 is formed of a sheet material having flexibility. Specifically, the limitation member 60 is formed of a woven fabric of polyester yarn, polyamide yarn or the like, in a similar fashion to other base members of the airbag 15. The limitation member 60 is composed of a base member 71 shown in FIG. 7.

The limitation member 60 includes a temporal holding section 63 which temporarily holds a folded region 57 of the airbag 15 (folded-up body 53), i.e., a part of the airbag 15, in a releasable fashion, a mounting section 61 which is secured to the bottom wall 12a of the case 12, and a connecting section 62 which is deformable and connects the temporal holding section 63 and the mounting section 61.

The mounting section 61 is provided with two mounting holes 61b for receiving the bolts 9a of the retainer 9. Between the mounting holes 61b is a semi-circular recessed region 61a recessed to the contour of the gas inlet port 19. The mounting section 61 is secured to the bottom wall 12a of the case 12 with the bolts 9a and nuts 10 together with the airbag 15 and inflator 8.

The connecting section 62 is formed into a trapezoid widening from the mounting section 61, and is disposed between the temporal holding section 63 and mounting section 61.

The temporal holding section 63 includes a rectangular base region 64 which is continuous with the connecting section 62 and is greater in dimension in a left and right direction than the connecting section 62, and a cover region 65 which has an identical rectangular contour to the base region 64 and is opposed to the base region 64. Between the cover region 65 and base region 64 is a holding recess 68 which lodges the folded region 57 of the airbag 15 temporarily. The holding recess 68 is formed into a bag or a pocket-like shape with an opening 69 from which the folded region 57 is stored and released. The opening 69 is so disposed as to face a boundary between the base region 64 and the connecting section 62. That is, the opening 69 of the temporal holding section 63 is located at an inner periphery of an unconnected hem 67 of the cover region 65, which is a part of the outer circumferential edge of the cover region 65 not joined to the base region 64.

The limitation member 60 of the illustrated embodiment further includes a pair of limitation arms 70 which extend from opposite edges of the temporal holding section 63 in such a manner that the connecting section 62 is disposed between the limitation arms 70, and are jointed to the case 12. The limitation arms 70 are designed to constrain the folded region 57 of the airbag 15 from unfolding and deploying in an initial stage of airbag deployment. In the illustrated embodiment, each of the limitation arms 70 has the same width as the base region 64 and extends from left and right ends 64a and 64b of the base region 64. Each of the limitation arms 70 has a mounting hole 70a at the leading end for receiving the bolt 9a of the retainer 9. By being fastened with the bolts 9a, the limitation arms 70 are jointed to the case 12. In the illustrated embodiment, the same bolt 9a is inserted into the mounting hole 70a and adjoining mounting hole 61b of the mounting section 61.

Figure 7:
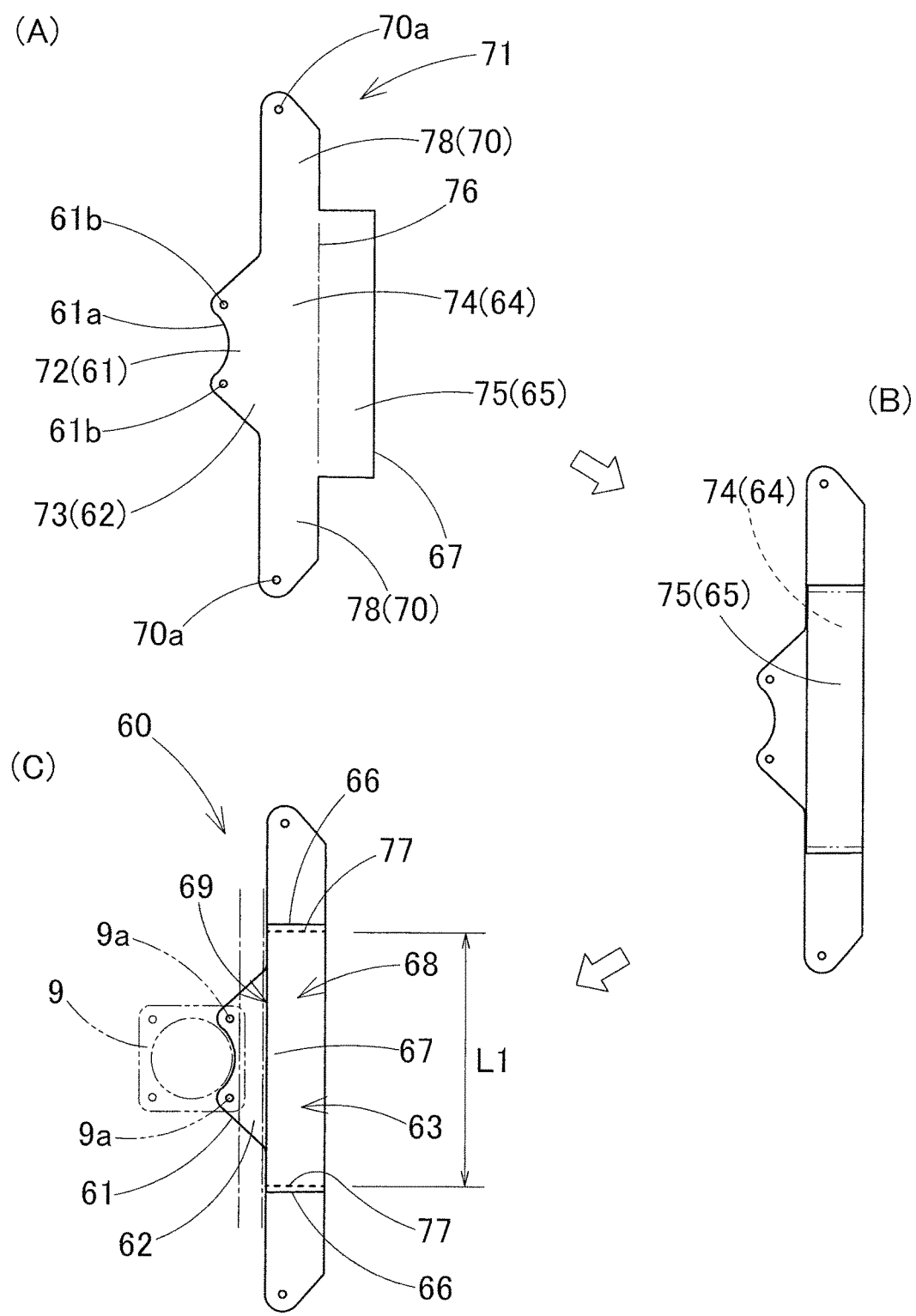
FIG. 7 illustrates the producing process of the limitation member of FIG. 6.

The limitation member 60 is composed of a base member 71 shown in FIG. 7. In the base member 71, a mounting-section forming region 72 for forming the mounting section 61, a connecting-section forming region 73 for forming the connecting section 62, a base forming region 74 for forming the base region 64, and a cover forming region 75 for forming the cover region 65 are disposed in tandem, and a pair of arm forming regions 78 for forming the limitation arms 70 extend from opposite edges of the base forming region 74. The limitation member 60 is formed by folding the cover forming region 75 over the base forming region 74 on a crease 76 formed at the boundary between the cover forming region 75 and the base forming region 74 as shown in (A) and (B) of FIG. 7, and sewing the cover forming region 75 and the base forming region 74 together at left and right edges with seams 77, as shown in (C) of FIG. 7. The seams 77 form connected hems 66 of the cover region 65 and extend from opposite ends of the unconnected hem 67 of the cover region 65.

As shown in FIGS. 11A and 11B, the limitation member 60 is disposed with respect to the folded-up body 53 as follows: the mounting section 61 and regions with the mounting holes 70a of the limitation arms 70 are disposed on the bottom surface 53a, the connecting section 62 is disposed on the side 53b, the limitation arms 70 are disposed on the sides 53d and 53e, and the temporal holding section 63 is disposed in such a manner that the base region 64 is disposed in a vicinity of the top surface 53c of the folded-up body 53 while the cover region 65 is disposed closer to the bottom surface 53a of the folded-up body 53 than the base region 64. The folded region 57 of the folded-up body 53 is stored inside the holding recess 68.

The limitation member 60 is assembled with the folded-up body 53 as follows: Firstly, when the above-described front-rear contracted airbag 50 is transformed to the second front-rear contracted airbag 51 as shown in FIG. 10B and 11A in the folding process of the airbag 15, the mounting section 61 is disposed on the bottom surface 53a of the airbag 15 by inserting the bolts 9a of the retainer 9 into the mounting holes 61b. Then the folded region 57, which refers to an upper region 51aa of the bellows-folded region 51a, is stored inside the temporal holding section 53, and the bolts 9a of the retainer 9 are inserted through the mounting holes 70a of the limitation arms 70.

At this time, as shown in FIGS. 11A and 11B, the connecting section 62 of the limitation member 60 is disposed on the rear side 53bb (of the side 53b) of the folded-up body 53, and the limitation arms 70 are applied to outer surfaces of the left and right sides 53d and 53e. When the folding is completed, the front region 51b of the second front-rear contracted airbag 51 is disposed over the front side 53bf (of the side 53b) and top surface 53c of the folded-up body 53 so as to cover the front periphery (i.e., leading end 63a region) of the temporal holding section 63.

That is, the folded region 57 of the airbag 15 (i.e., folded-up body 53) stored inside the holding recess 68 of the temporal holding section 63 of the limitation member 60 is a part of a rear region 56 of the airbag 15 (the folded-up body 53). The rear region 56 of the airbag 15 refers to a region of the airbag 15 disposed at the rear of the front region 51b (i.e., a front region 55) which is disposed in front of the gas inlet port 19, as shown in FIG. 10B. That is, the rear region 56 refers to the region disposed at the rear of the gas inlet port 19.

Figure 12:
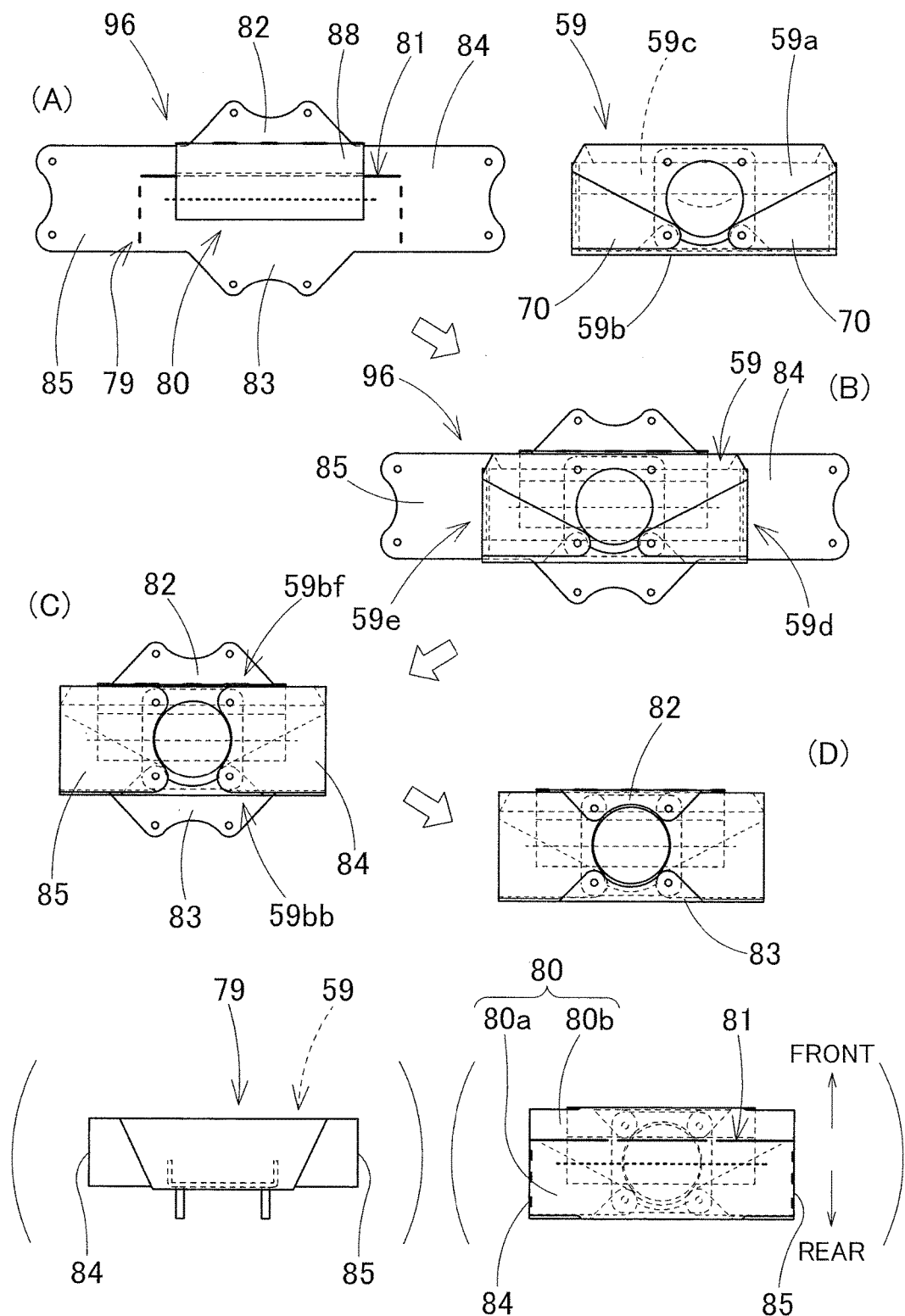
FIG. 12 illustrates the process of wrapping a folded-up body of the airbag with the wrapping member provided with the flap member.
Figure 13A:
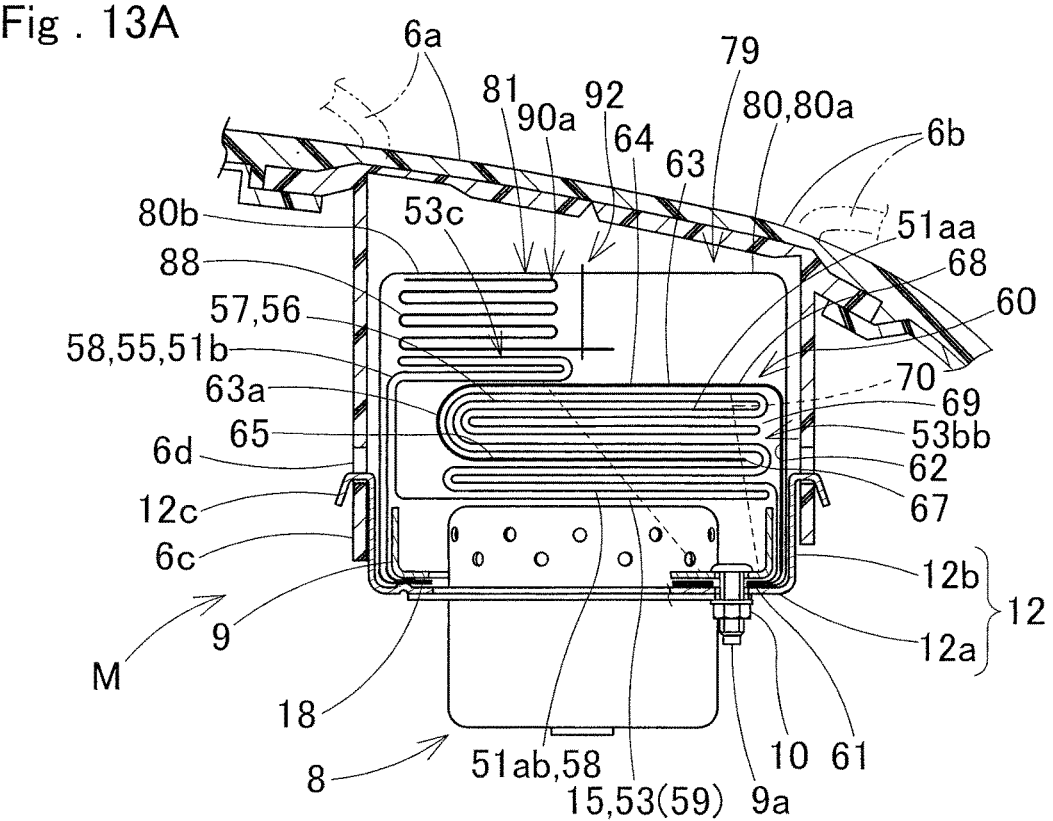
FIGS. 13A, 13B, 14A and 14B illustrate an inflating behavior of the airbag of the airbag device of FIG. 1.

As shown in FIGS. 1, 12 and 13A, the wrapping member 79 is wrapped around the folded-up body 53 on which the limitation member 60 is mounted (which will hereinafter called a "half-assembled body 59", as shown in FIG. 11B) for keeping the airbag 15 in a folded-up configuration. The wrapping member 79 is provided with a flap member 88, as described above. The wrapping member 79 is formed of a sheet member of flexible woven fabric of polyester yarn, polyamide yarn or the like, in a similar fashion to the members of the airbag 15 and limitation member 60.

Figure 8:
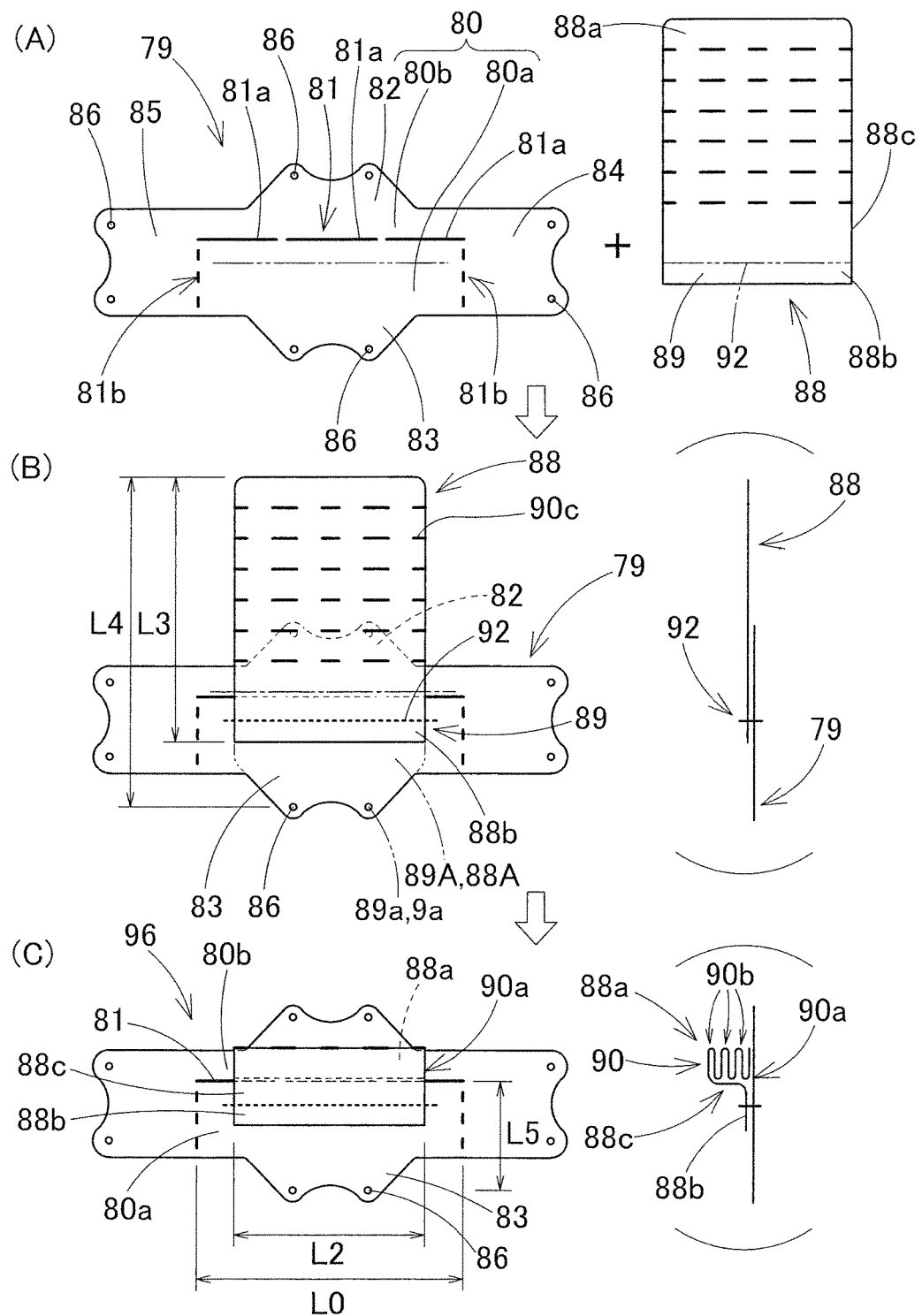
FIG. 8 illustrates the process of assembling a wrapping member and a flap member.

As shown in FIGS. 8 and 12, the wrapping member 79 includes a rectangular top section 80 to be disposed over the top surface 59c of the half-assembled body 59, and four mounting sections 82, 83, 84 and 85 extending towards the front, rear, left and right from the top section 80. The top section 80 is provided with a tearable region 81 which is composed of a plurality of slits 81a formed in an interspaced fashion along a left and right direction and is tearable at airbag deployment. The length L0 in a left and right direction of the tearable region 81 (see (C) of FIG. 8) is generally coincident with the length L1 in a left and right direction of the temporal holding section 63 of the limitation member 60 (see (C) of FIG. 7). Each of the mounting sections 82, 83, 84 and 85 is provided with two retaining holes 86 for receiving the bolts 9a of the retainer 9 protruding out of the bottom surface 59a of the half-assembled body 59.

The tearable region 81 of the illustrated embodiment is disposed slightly to the front with respect to the center in a front and rear direction of the top section 80, and is further provided, at the left and right ends, with a plurality of auxiliary slits 81b. The auxiliary slits 81 help open the rear region 80a of the top section 80 rearward like a hinged door when the tearable region 81 is torn, such that the top surface 59c of the half assembled body 59 is opened widely.

Referring to FIG. 8, the flap member 88 is formed of a rectangular sheet member of flexible woven fabric of polyester yarn, polyamide yarn or the like, in a similar fashion to the members of the airbag 15, the limitation member 60, and the wrapping member 79. The flap member 88 is sewn to the rear region 80a of the top section 80 of the wrapping member 79, specifically, at the rear of the tearable region 81, by the mounting region 89, which is a root region 88b of the flap member 88.

The width L2 in a left and right direction of the flap member 88 is smaller than the length L1 in a left and right direction of the temporal holding section 63 of the limitation member 60, and the length L3 of the flap member 88 from the root region 88b to the leading end region 88a is configured so long as to reach a passenger IP located too close to the airbag device M by the leading end region 88a, and cover and protect the passenger IP from the airbag 15 at airbag deployment. The length L3 is also so configured as not to reach an normally-seated passenger PP, as shown in FIG. 1. In the illustrated embodiment, the flap member 88 is mounted on the case 12 through the medium of the wrapping member 79 by being sewn to the wrapping member 79, and the wrapping member 79 is mounted on the case 12 by the mounting sections 82, 83, 84 and 85. Thus the length L3 of the flap member 88 can be translated into a length L4 between the retaining holes 86 of the rear mounting section 83 of the wrapping member 79 and the leading end region 88a of the flap member 88. The length L4 in the illustrated embodiment is about 450 mm.

As shown in FIG. 13A, in the completed airbag device M, the flap member 88 is disposed on the top surface 53c of the folded-up body 53 and between the temporal holding section 63 of the limitation member 60 and the top section 80 of the wrapping member 79. The flap member 88 as mounted on the folded-up body 53 includes, at the leading end region 88a, a severalfold region 90 which is folded in layers. The severalfold region 90 of the illustrated embodiment is formed by bellows-folding. To describe more specifically, the flap member 88 is sewn to the rear region 80a of the top section 80 of the wrapping member 79 with a seam 92 extending in a left and right direction, as described above. The seam 92 is formed at a position towards the connecting section 62 of the imitation member 60 (i.e., towards the mounting section 83 of the wrapping member 79) with respect to the tearable region 81 of the wrapping member 79. The severalfold region 90 (i.e., the leading end 88a region) is disposed at the front region 80b of the top section 80 of the wrapping member 79, i.e., on an opposite side of the seam 92 (or mounting region 89) with respect to the tearable region 81.

In the illustrated embodiment, the length L5 (see (C) of FIG. 8) between the mounting point of the flap member 88 to the case 12 (i.e., the retaining hole 86 of the mounting section 83) and a root region 90a of the severalfold region 90 (i.e., a region of the severalfold region 90 disposed towards the mounting region 89) is longer than a length of the limitation member 60 between the mounting section 61 (more specifically, the mounting hole 61b) and the leading end 63a of the temporal holding section 63 such that the root region 90a of the severalfold region 90 is disposed farther forward than the leading end 63a (FIG. 16) of the temporal holding section 63 (i.e., dislocated outward of the leading end 63a) and is allowed to move at airbag deployment.

As described above, the flap member 88 is sewn to the rear region 80a of the wrapping member 79 by the mounting region 89. Therefore, it can be said that the flap member 88 is mounted on the case 12 through the medium of the rear region 80a and mounting section 83 of the wrapping member 79.

Moreover, as shown in (B) of FIG. 8, the flap member 88 is provided, on creases 90b of the bellows-folding of the severalfold region 90, with a plurality of slits or roulettes 90c for facilitating the folding.

(A) of FIG. 12 shows a wrapping member unit 96, which is the wrapping member 79 on which the flap member 88 is mounted with the severalfold region 90 disposed at a predetermined position as described above. The wrapping member unit 96 is mounted on the half-assembled airbag 59 as follows: As shown in (A) and (B) of FIG. 12, the half-assembled airbag 59 is placed on the top section 80 of the wrapping member unit 96 in an unfolded state with the top surface 53c facing towards the top section 80. Then as shown in (C) and (D) of FIG. 12, the mounting sections 84 and 85 of the wrapping member 79 are applied to the left and right sides 59d and 59e of the half-assembled airbag 59 and the bolts 9a are inserted into the retaining holes 86 thereof. If then the mounting sections 82 and 83 of the wrapping member 79 are applied to the front side 59bf and rear side 59bb and the bolts 9a are inserted into the retaining holes 86 thereof, the half-assembled airbag 59 is wrapped by the wrapping member unit 96.

The half-assembled airbag 59 wrapped by the wrapping member unit 96 is set in the case 12 such that the bolts 9a protrude out of the bottom wall 12a of the case 12. Then the bolts 9a projecting out of the bottom wall 12a are put through the flange 8c of the inflator 8 and fastened with nuts 10. Thus the airbag 15 and the inflator 8 are mounted on the case 12. Thereafter, the case 12 is mounted on the airbag cover 6 which is integral with the dashboard 1 and has already mounted on a vehicle with the aid of the retaining holes 6d of the airbag cover 6 and the retaining hooks 12c of the case 12. Then if unillustrated brackets of the case 12 are secured to the vehicle body structure, the airbag device M is mounted on the vehicle.

After the airbag device M is mounted on the vehicle, when the airbag device M is actuated in the event of frontal collision of the vehicle, the inflator 8 emits an inflation gas into the airbag 15, and the airbag 15 is inflated and tears the top section 80 of the wrapping member 79 and pushes and opens the doors 6a and 6b of the airbag cover 6. Then the airbag 15 protrudes upward out of an opening formed by the opening of the doors 6a and 6b, and deploys rearward in such a manner as to fill up a space between the top plane 2 of the dashboard 1 and windshield 4 as indicated with double-dotted lines in FIG. 1.

Figure 13B:
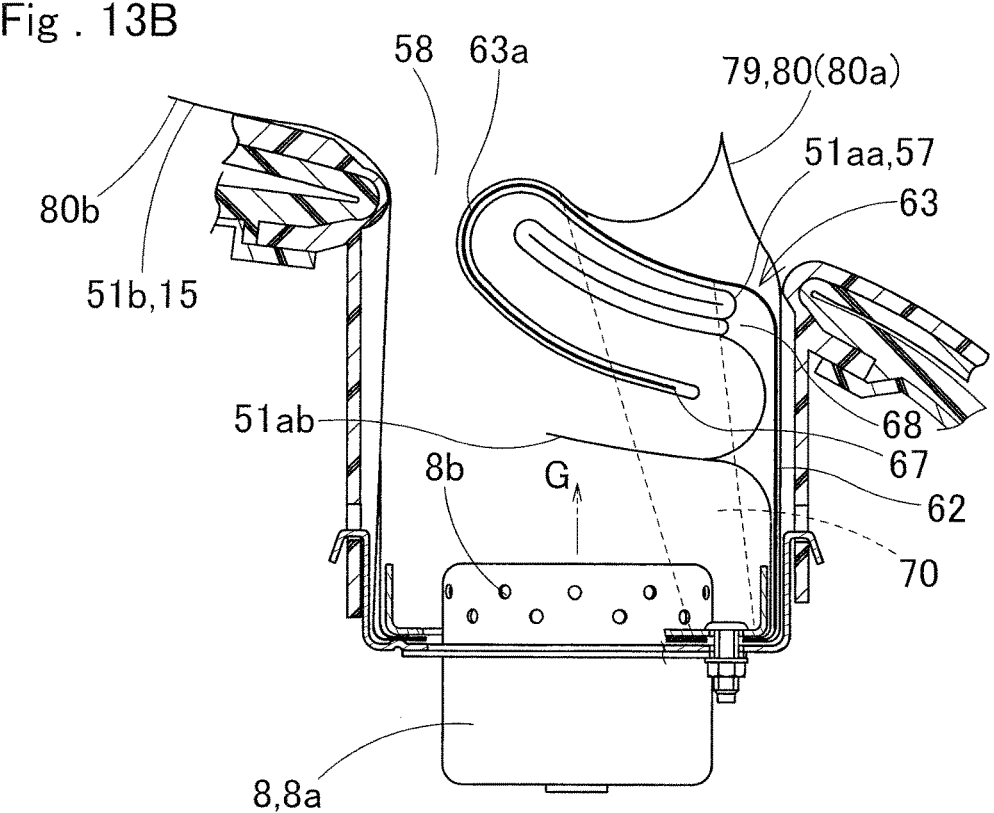

To describe more specifically, if the airbag 15 of the illustrated embodiment is fed with an inflation gas G, the airbag 15 tears the tearable region 81 of the wrapping member 79 and unfolds and protrudes out of the torn top section 80 of the wrapping member 79, as shown in FIGS. 13A and 13B. At this time, initially, an initial inflatable region 58 of the airbag 15, which is not stored inside the temporal holding section 63 of the limitation member 60 and is closer to the inflation gas source, is unfolded and inflated while the folded region 57 stays stored inside the temporal holding section 63 of the limitation member 60. In the illustrated embodiment, the initial inflatable region 58 refers to the front region 51b of the airbag 15 and a lower region 51ab of the bellows-folded region 51a (see FIGS. 11A, 11B and 13A).

Figure 14A:
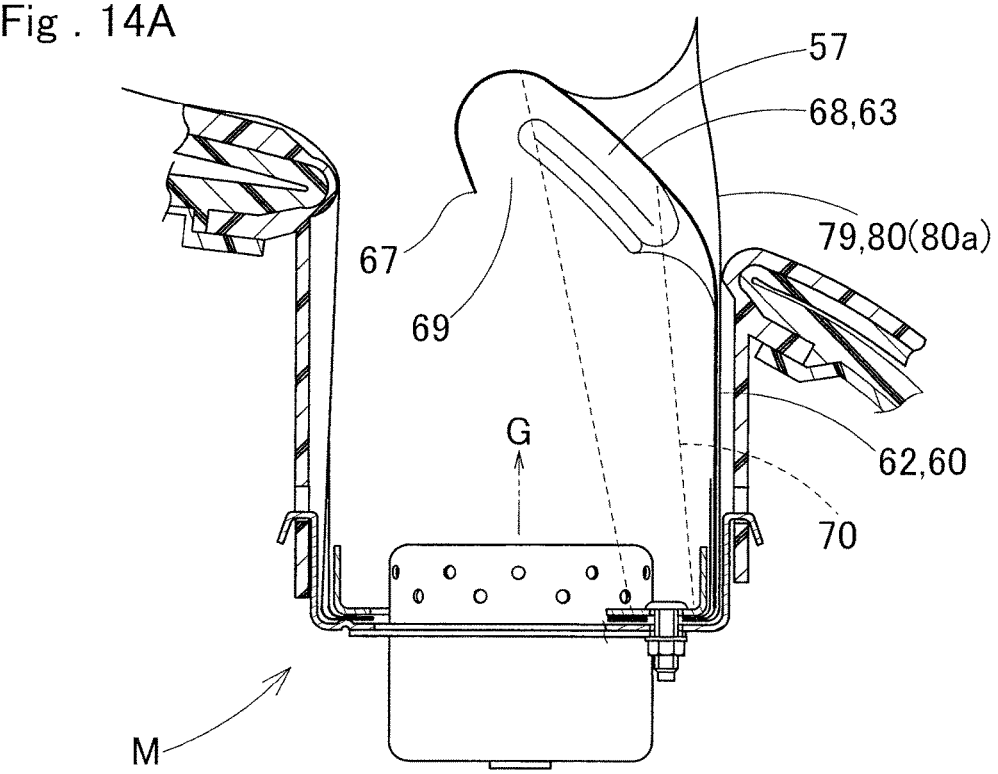
Figure 14B:
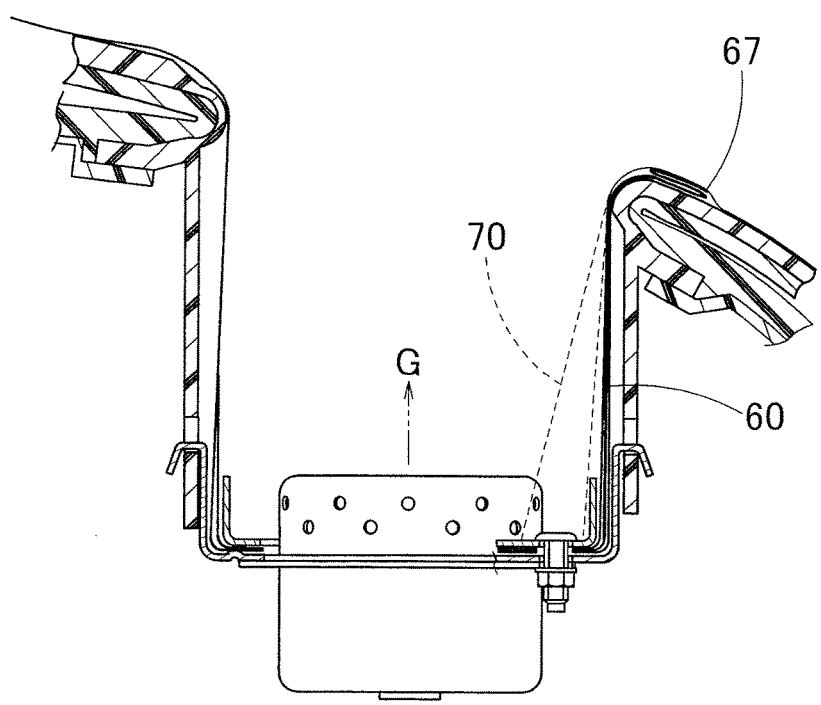

The limitation member 60 of the illustrated embodiment is configured with flexibility. Although the limitation member 60 is fixed to the bottom wall 12a of the case 12 by the mounting section 61, the temporal holding section 63 of the limitation member 60 turns along with the behavior of the folded region 57 due to deformation of the connecting section 62 which is disposed between the mounting section 61 and temporal holding section 63. Then if the folded region 57 of the airbag 15 is inflated itself and pulled by the initial inflatable region 58 which is further unfolded and inflated, the folded region 57 slips out of the temporal holding section 63 (i.e., out of the holding recess 68) via the opening 69 which has been widened due to deformation of the unconnected hem 67 of the temporal holding section 63, and is freed from constraint by the temporal holding section 63 as shown in FIG. 13B, 14A and 14B. Then the airbag 15 further unfolds and deploys as a whole as shown in FIG. 15.

To describe more specifically, when the folded region 57 of the airbag 15 slips out of the temporal holding section 63, the opening 69 of the temporal holding section 63 turns due to deformation of the connecting section 62 and the unconnected hem 67 of the temporal holding section 63 forming the periphery of the opening 69 is also deformed. Accordingly, the folded region 57 is allowed to slip out of the temporal holding section 63 and freed from constraint smoothly, and the airbag 15 is also freed from constraint from unfolding and deploying.

Until the folded region 57 is freed from constraint by the temporal holding section 63, the airbag 15, especially the initial inflatable region 58, is constrained from unfolding, deploying, and protruding out of the case 12. When the folded region 57 is freed from constraint thereafter, the whole airbag 15 including the initial inflatable region 58 is allowed to complete deployment. Therefore, with the airbag device M of the illustrated embodiment, a desired inflated state of the airbag 15 will be attained in an initial stage of airbag deployment.

Figure 15:
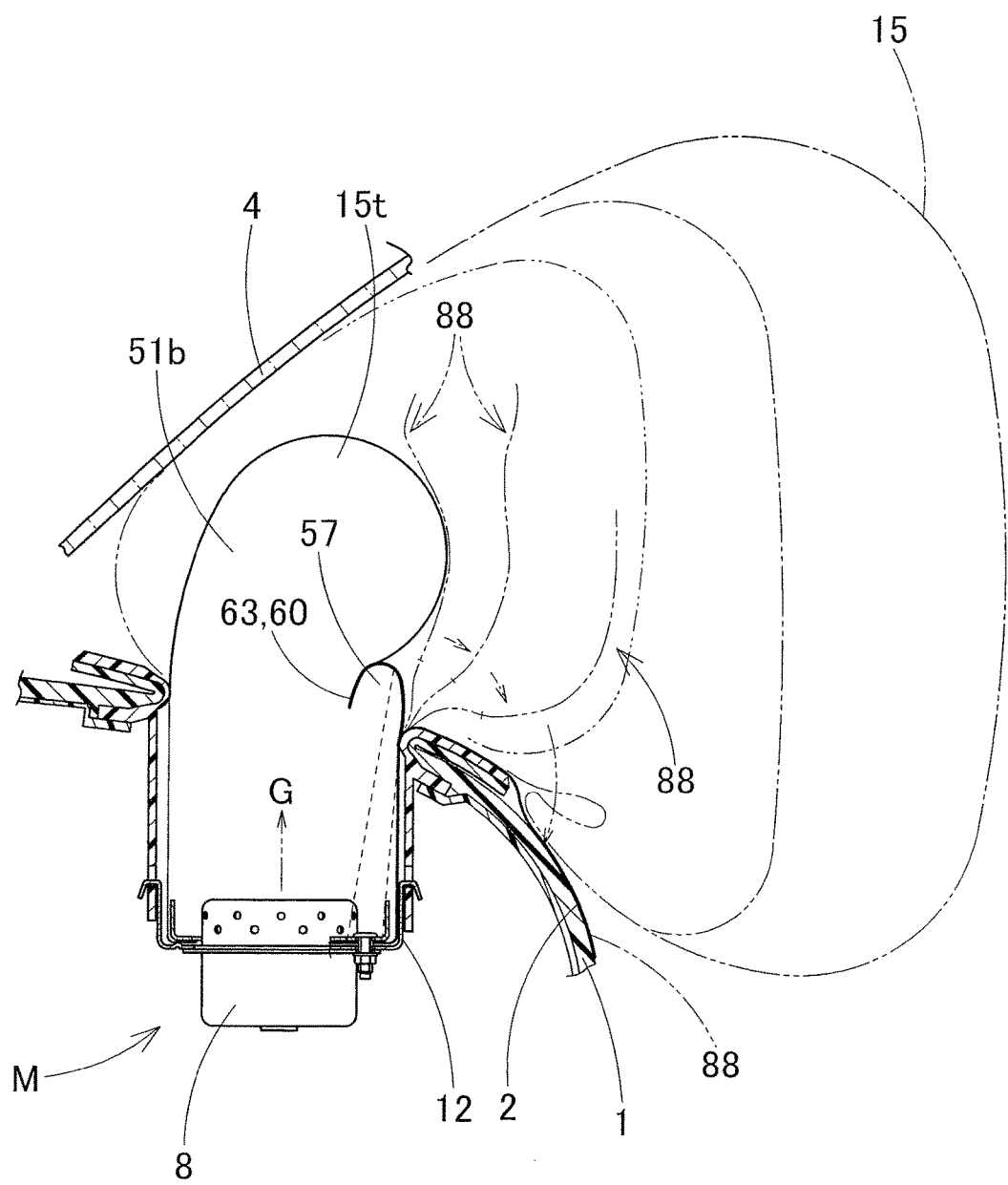
FIG. 15 schematically illustrates the inflating behavior of the airbag of the airbag device of FIG. 1.

At the same time, the wrapping member 79 is torn while the initial inflatable region 58 unfolds and inflates, and the flap member 88, which has been disposed between the temporal holding section 63 of the limitation member 60 and the top section 80 of the wrapping member 79, is deployed out of the case 12 along with the rotation of the temporal holding section 63 and, as shown in FIG. 15.

Figure 16:
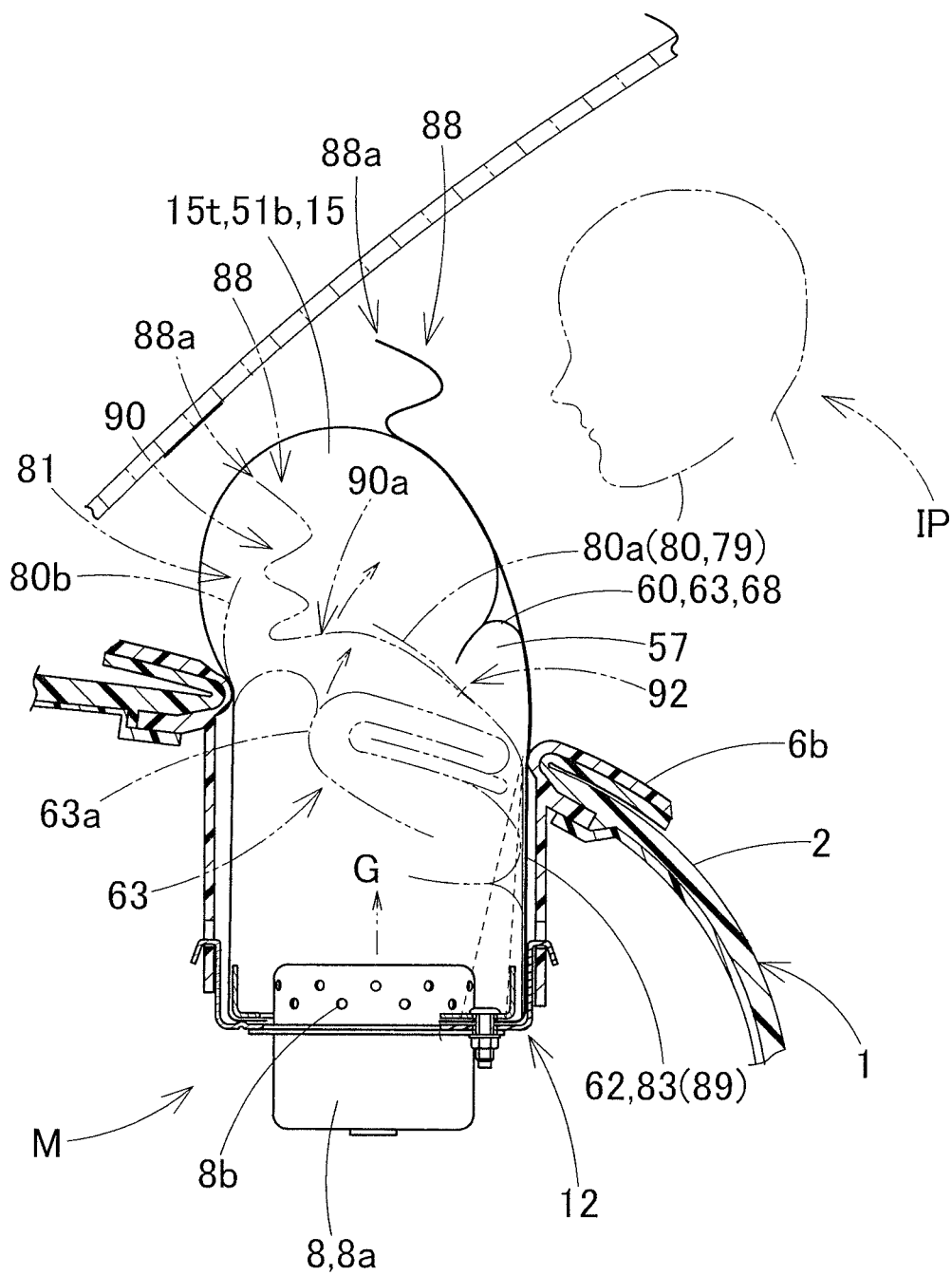
FIGS. 16, 17 and 18 illustrate a deployment behavior of the flap member against an abnormally-seated vehicle occupant at airbag deployment.
Figure 17:
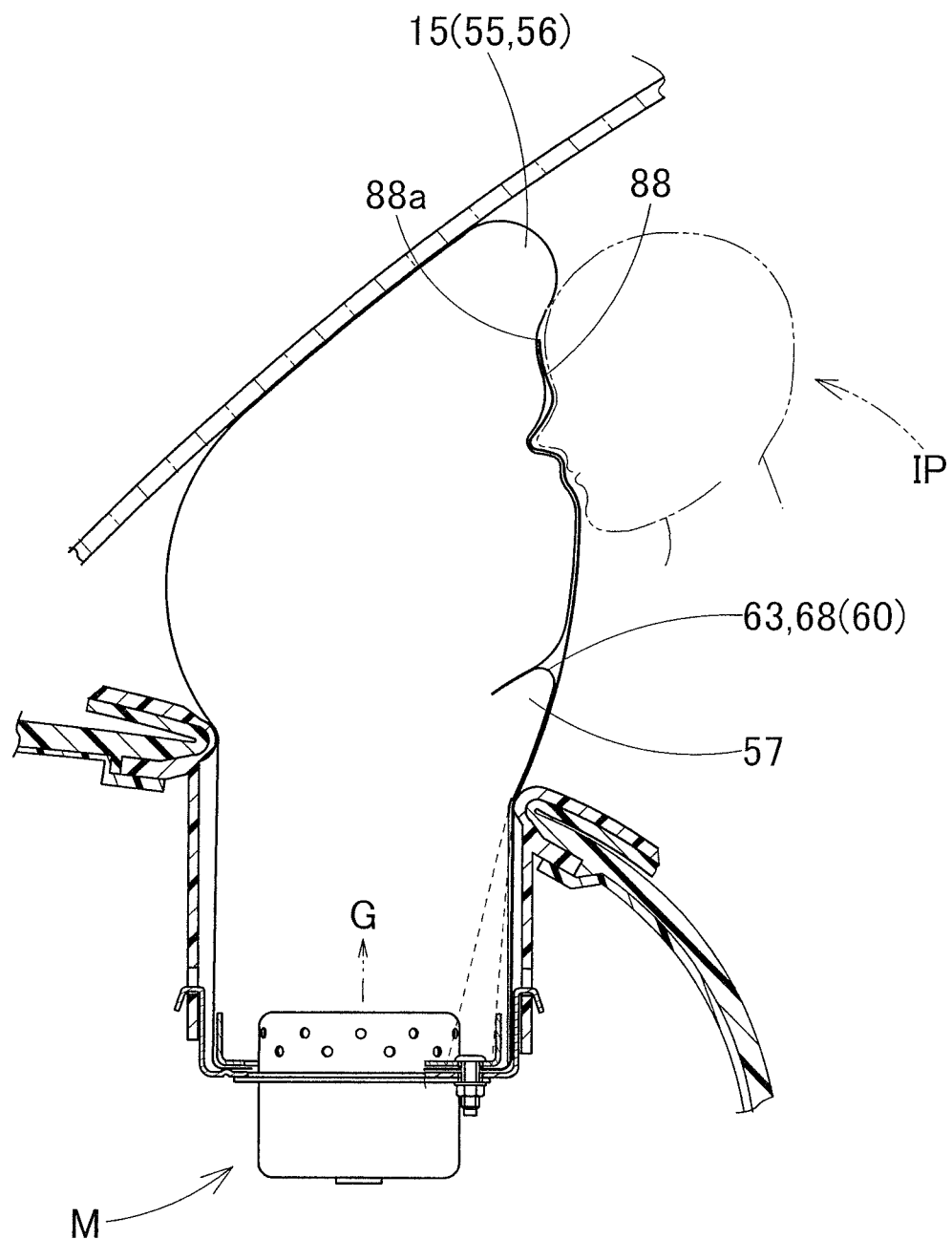
Figure 18:
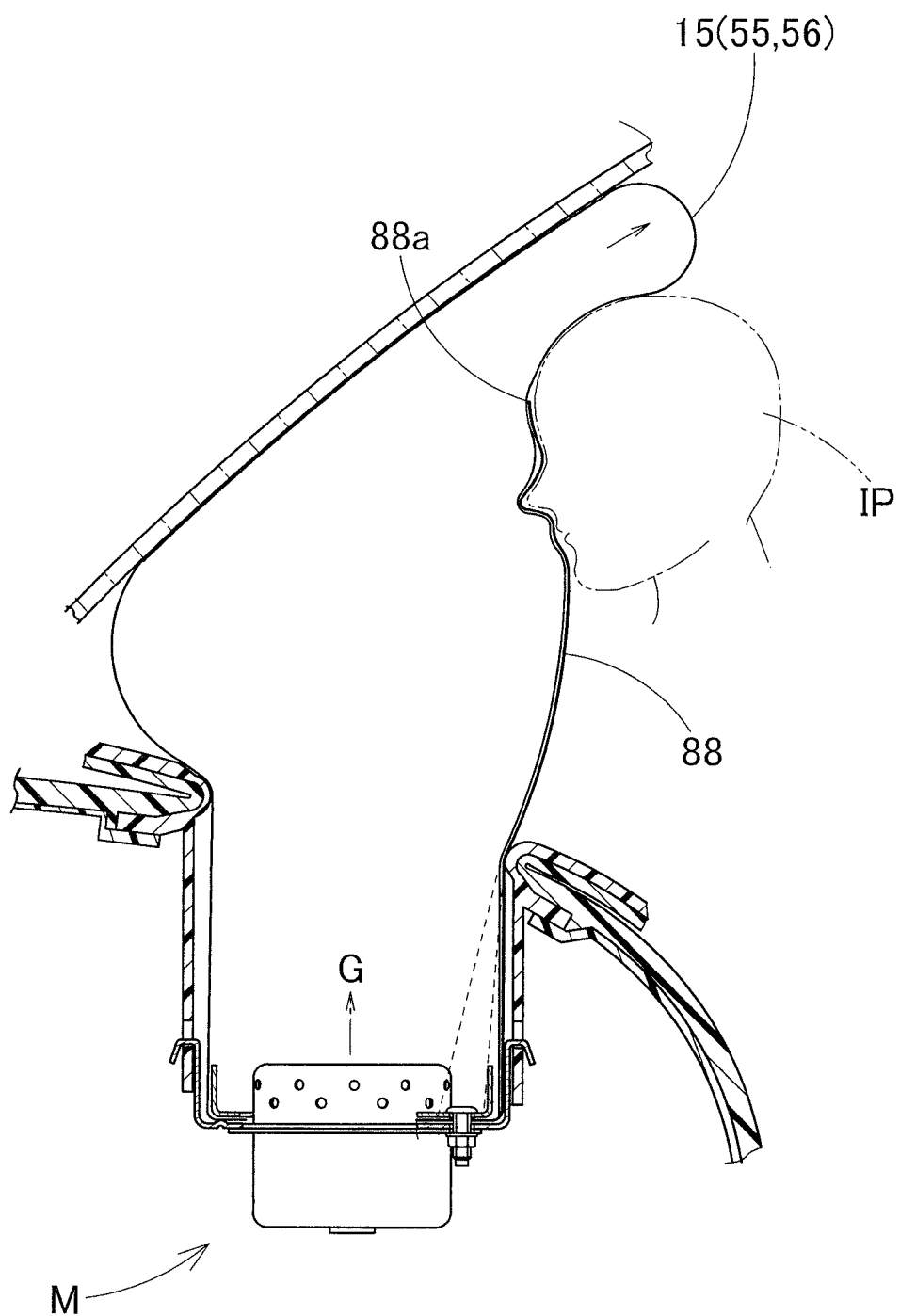

If, at this time, the passenger is located too close to the airbag device M (i.e., to the case 12) like an abnormally-seated passenger IP indicated with double-dotted lines in FIGS. 16 to 18, the leading end region 88a of the flap member 88 will be brought into contact with the passenger IP and cover the passenger IP, and redirect the course of deployment of the airbag 15 upward or the like, such that a pressure which would otherwise be given to the abnormally-seated passenger IP will be reduced and the abnormally-seated passenger IP will be protected in an adequate fashion. In other words, if the leading end region 88a of the flap member 88 covers the passenger IP, the leading end region 88a of the flap member 88 will act like a shield, and the airbag 15 will be forced to be deployed upward and to the left and right of the shield. Therefore, the pressure which would otherwise be given to the abnormally-seated passenger IP will be reduced and the abnormally-seated passenger IP will be protected in an adequate fashion. If the passenger is seated at a normal position like a normally-seated passenger PP indicated with double-dotted lines in FIG. 1, the leading end region 88a of the flap member 88 will complete deployment without contacting the passenger PP, and the airbag 15 will also be inflated and deployed smoothly without being constrained by the flap member 88 as shown in FIG. 15, although the airbag 15 will be subjected to constraint by the limitation member 60. Therefore, the normally-seated passenger PP will be protected in a suitable fashion.

Therefore, the airbag device M of the illustrated embodiment is capable of constraining the airbag 15 from being deployed temporarily and freeing it from constraint thereafter smoothly to attain a desired inflated state of the airbag 15 in an initial stage of airbag deployment, and is capable of protecting both the abnormally-seated passenger IP and normally-seated passenger PP in an adequate fashion.

The configuration of the illustrated embodiment is different from such a configuration that a limitation member is jointed to an outer circumferential wall of the airbag and constrains the deployment of the airbag until the limitation member is torn when a predetermined tension force is applied to the limitation member. Therefore, in the configuration of the illustrated embodiment, a connecting strength between the limitation member and the outer circumferential wall of the airbag does not have to be considered, and a predetermined folded region 57 of the airbag 15 has only to be stored inside the holding recess 68 of the temporal holding section 63. That is, the configuration of the illustrated embodiment will help constrain a predetermined region of the airbag 15 (an initial protruding region 15t, see FIG. 15) from unfolding and inflating easily.

In the airbag device M of the illustrated embodiment, the flap member 88 is joined to the rear region 80a of the top section 80 of the wrapping member 79 by the mounting region 89, and thus is mounted on the case 12 through the medium of the mounting section 83 of the wrapping member 79.

This configuration will help simplify the assembling of the airbag device M since the flap member 88 does not have to be mounted on the case (i.e., housing) 12 directly.

If such an advantageous effect does not have to be considered, the flap member may be configured like a flap member 88A indicated in (B) of FIG. 8 with double-dotted lines. The flap member 88A is provided, at the root region 88b, with a mounting section 89A like the mounting section 61 and connecting section 62 of the limitation member 60, with two mounting holes 89a for receiving the bolts 9a of the retainer 9 such that the flap member 88A is directly mounted on the bottom wall 12a of the case 12 by the mounting section 89A together with the mounting section 61 of the limitation member 60 and the mounting section 83 of the wrapping member 79.

Figure 19:
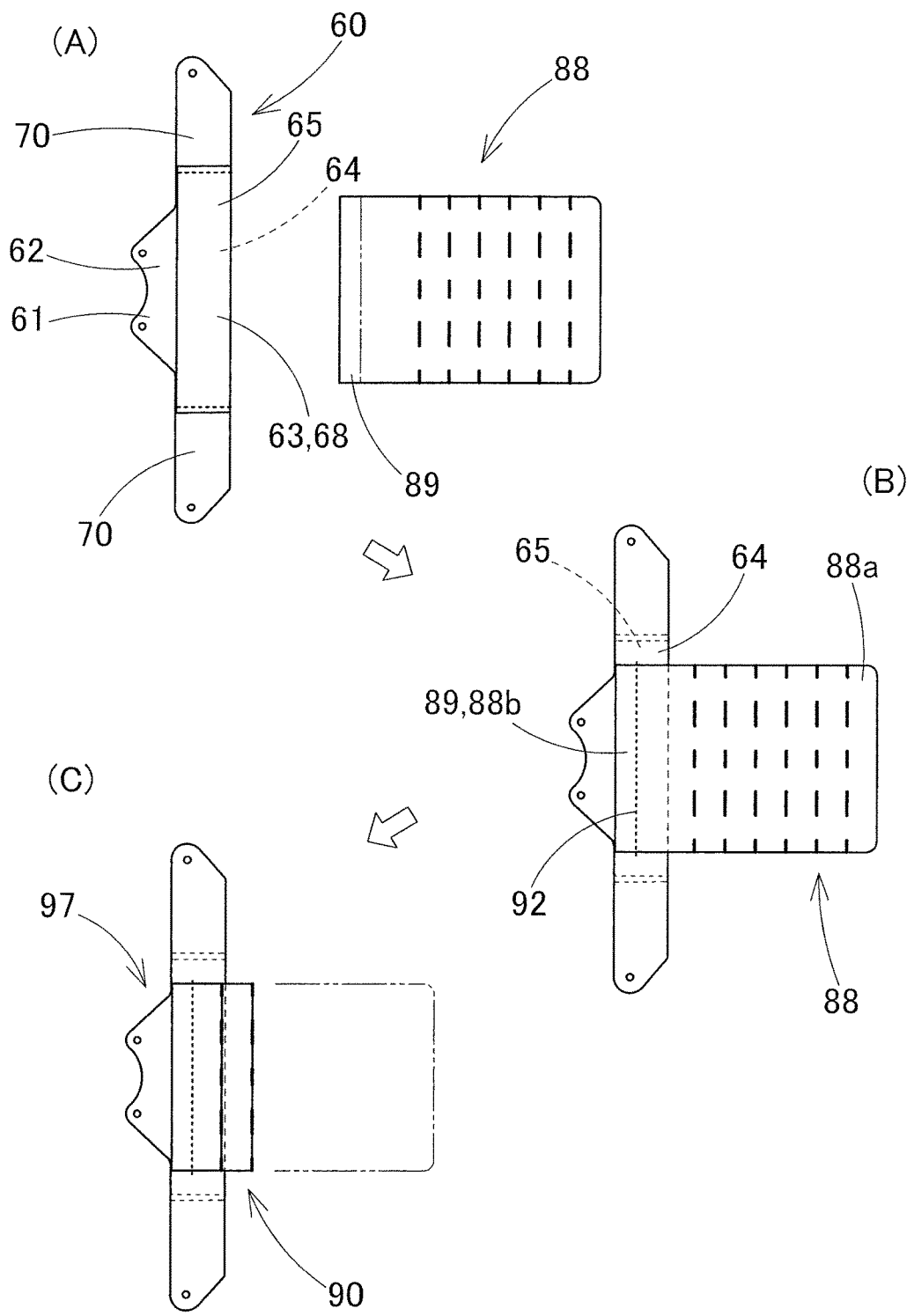
FIG. 19 illustrates the process of assembling a limitation member and a flap member.

Although the mounting region 89 (i.e., the root region 88b) of the flap member 88 is joined to the rear region 80a of the top section 80 of the wrapping member 79 in the foregoing embodiment, the flap member 88 may be alternatively jointed to the limitation member 60. By way of example, as shown in FIG. 19, it is conceivable to join the mounting region 89 of the flap member 88 to the base region 64 of the temporal holding section 63 with a seam 92 extending in a left and right direction, such that the flap member 88 is mounted on the case (housing) 12 through the medium of the connecting section 62 and mounting section 61 of the limitation member 60.

Further, if the flap member 88 is preliminarily jointed to the wrapping member 79 or limitation member 60 to form the wrapping member unit 96 or a limitation member unit 97 (FIG. 19), the unit 96 or 97 can be handled as a single module, which will facilitate the forming of the folded-up body 53 or half-assembled body 59, and mounting the half-assembled body 59 on the case 12.

Figure 20:
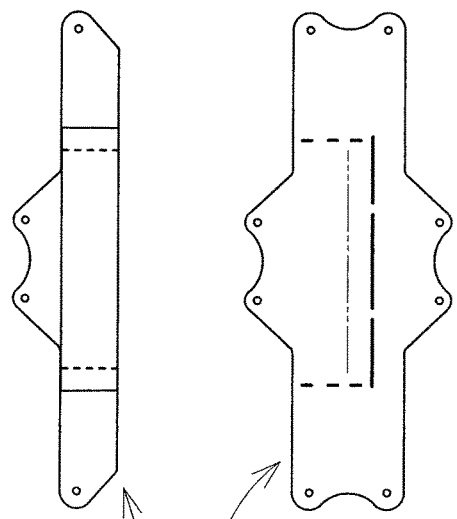
FIG. 20 illustrates the process of assembling a flap member, a limitation member and a wrapping member.
Figure 20:
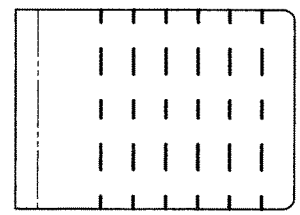
Figure 20:
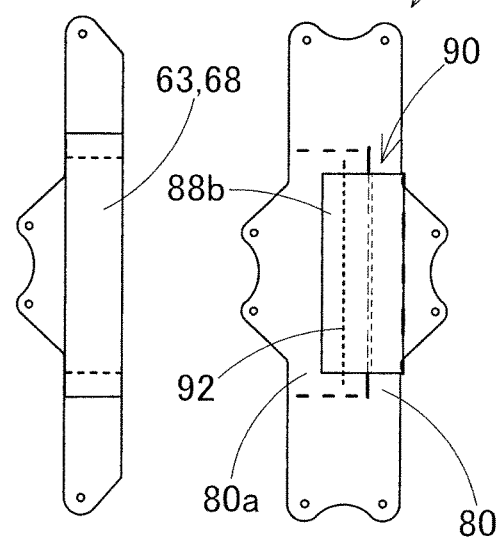
Figure 20:
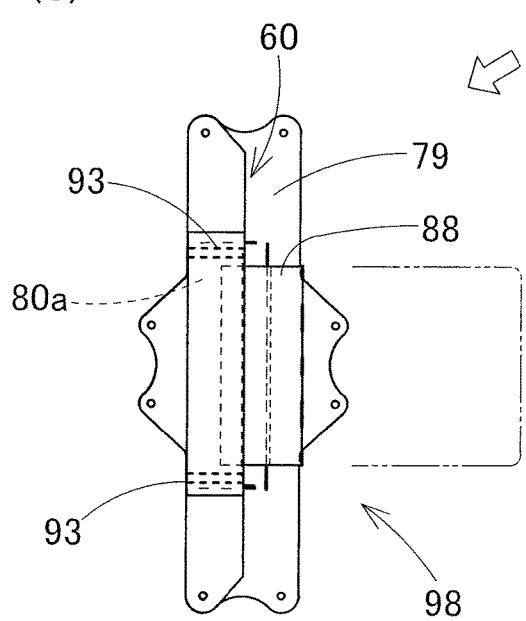

It is also conceivable to form a unit 98 which integrates the wrapping member 79, the flap member 88 and the limitation member 60 preliminarily, as shown in FIG. 20. The unit 98 is formed by joining the left and right ends of the temporal holding section 63 of the limitation member 60 to the wrapping member unit 96 with a sewing seam 93, which is formed by joining the flap member 88 to the rear region 80a of the top section 80 of the wrapping member 79 with the seam 92. Specifically, the left and right ends of the temporal holding section 63 are joined to the rear region 80a of the top section 80 of the wrapping member 79. Such a unit 98 can alternatively be formed by forming firstly the limitation member unit 97 in which the limitation member 60 and flap member 88 is integrated, and then joining the limitation member unit 97 to the rear region 80a of the top section 80 of the wrapping member 79.

In the units 96, 97 and 98, the mounting region 89 (i.e., the root region 88b) of the flap member 88 is joined to the rear region 80a of the top section 80 of the wrapping member 79 or to a corresponding position of the limitation member 60 with the seam 92. However, the mounting region 89 (i.e., the root region 88b) of flap member 88 may be alternatively jointed to the mounting section 83 of the wrapping member 79 or to the connecting section 62 or mounting section 61 of the limitation member 60, which are closer to the bottom wall 12a of the case 12 than the rear region 80a of the top section 80 of the wrapping member 79.

In the airbag device M of the foregoing embodiment, the folded-up body 53 of the airbag 15 is held by the case 12 on the bottom surface 53a, and the folded region 57 of the airbag 15 constrained by the limitation member 60 temporarily is disposed in a vicinity of the top surface 53c of the folded-up body 53. The mounting section 61 of the limitation member 60 is disposed on the bottom surface 53a of the folded-up body 53, and the connecting section 62 of the limitation member 60 is disposed on the side 53b (53bb) of the folded-up body 53. The temporal holding section 63 is disposed in such a manner that the base region 64 is disposed in a vicinity of the top surface 53c of the folded-up body 53 while the cover region 65 is disposed closer to the bottom surface 53a of the folded-up body 53 than the base region 64. The flap member 88 includes the severalfold region 90 which is formed by folding the leading end region 88a of the flap member 90 in layers. The length L5 of the flap member 88 between the mounting region to the vicinity of the case 12 (i.e., the retaining hole 86 of the mounting section 83 of the wrapping member 79) and the root region 90a of the severalfold region 90 is longer than a length of the limitation member 60 between the mounting section 61 (more specifically, the mounting hole 61b) and the leading end 63a (FIG. 16) of the temporal holding section 63 such that the root region 90a of the severalfold region 90 is disposed farther forward than the leading end 63a of the temporal holding section 63 (i.e., dislocated outward of the leading end 63a) and is allowed to move at airbag deployment.

In the airbag 15 which is folded up and assembled with the limitation member 60 and flap member 88 as described above, the temporal holding section 63 is bent from the connecting section 62 of the limitation member 60 and arranged in parallel to the bottom surface 53a of the folded-up body 53. With this configuration, in order that the folded region 57 of the airbag 15 slips out of the opening 69 of the temporal holding section 63 at airbag deployment, the temporal holding section 63 has to rotate in such a manner as to draw away from the bottom wall 12a of the case 12 by deforming the connecting section 62 and then the unconnected hem 67 of the cover region 65 has to be deformed to enlarge the opening 69 of the temporal holding section 63, as shown in FIGS. 13A, 13B and 14A. That is, during this behavior of the temporal holding section 63, the airbag 15 will keep constrained from unfolding and inflating. Once the opening 69 is then enlarged enough to release the folded region 57, the airbag 15 will be deployed quickly as a whole.

Further, since the length L5 of the flap member 88 is predetermined as described above, the severalfold region 90 of the flap member 88 will be unfolded and deployed smoothly on an outside of a rotational trajectory of the leading end 63*a* of the temporal holding section 63, as shown in FIG. 16. That is, the configuration of the foregoing embodiment is not likely to cause such an undesirable situation that the flap member would be stuck between the temporal holding section 63 and the top plane 2 of the dashboard 1 or the door 6*b* of the airbag cover 6 and fail to be deployed towards the vehicle seat, but will help attain a steady deployment of the flap member 88.

In the foregoing embodiment, moreover, the connecting section 62 of the limitation member 60 is disposed on the side 53*bb* of the folded-up body 53 facing towards a deployment direction of the airbag 15. The wrapping member 79 includes, in a vicinity of the center of the top section 80 which is disposed over the top surface 53*c* of the folded-up body 53, the tearable region 81 that is formed along a width direction (i.e., along a left and right direction) of the connecting section 62 of the limitation member 60 and is tearable at airbag deployment, as shown in FIGS. 8, 12 and 13A. The flap member 88 is mounted on the case 12 through the medium of the wrapping member 79 by being joined to the wrapping member 79 on the mounting region 89. Specifically, the flap member 88 is joined to the rear region 80*a* of the top section 80 of the wrapping member 79, i.e., to an area of the wrapping member 79 disposed towards the connecting section 62 of the limitation member 60 with respect to the tearable region 81 of the wrapping member 79, on the top surface 53*c* of the folded-up body 53. The severalfold region 90 of the flap member 88 is disposed at the front region 80*b* of the top section 80 of the wrapping member 79, i.e., on the opposite side of the mounting region 89 with respect to the tearable region 81, on the top surface 53*c* of the folded-up body 53.

With the above configuration, the length of the flap member 88 can be controlled depending on the mounting position to the top section 80 of the wrapping member 79, and therefore, can be as short as possible. Further, as shown in (C) of FIG. 8, an intermediate region 88*c* of the flap member 88 between the leading end region 88*a* and root region 88*b* (mounting region 89) is disposed over (or straddle) the tearable region 81 of the wrapping member 79. With this configuration, when the airbag 15 is going to emerge out of the case 12 due to tearing of the tearable region 81, the severalfold region 90 of the flap member 88 will be pushed by the airbag 15 (especially, by the initial inflatable region 58 or the front region 51*b*) and pulled towards the mounting region 89 while staying on the front region 80*b* of the wrapping member 79. Then the severalfold region 90 will be pulled towards the mounting region 89 and unfold from the intermediate region 88*c*, and then rotate towards the vehicle seat on an outside of the rotational trajectory of the temporal holding section 63, without being constrained by the temporal holding section 63. As a consequence, in an initial stage of airbag deployment, as shown in FIGS. 15 and 16, the severalfold region 90 (i.e., the leading end 88*a* region) of the flap member 88 will quickly unfold on the outside of the airbag 15 and temporal holding section 63, and be turned towards the vehicle seat in an unfolded state. If, at this time, the passenger is seated in an abnormal fashion, the flap member 88 will contact and cover the passenger IP. Even if the length L3 of the flap member 88 is long and the severalfold region 90 is formed in many layers, the configuration of the foregoing embodiment will help unfold the severalfold region 90 smoothly for covering the abnormally-seated passenger IP.

Although the flap member 88 is joined to the wrapping member 79 in the foregoing embodiment, the flap member 88 may be instead joined to the base region 64 of the temporal holding section 63 of the limitation member 60 as in the limitation member unit 97 shown in FIG. 19, on condition that the flap member 88 is joined to a region of the limitation member 60 corresponding to the rear region 80*a* of the top section 80 of the wrapping member 79.

In the airbag device M of the foregoing embodiment, the limitation member 60 further includes a pair of limitation arms 70 that constrain the folded region 57 of the airbag 15 from unfolding and deploying in an initial stage of airbag deployment. The limitation arms 70 extend to the left and right from opposite edges of the temporal holding section 63 in such a manner that the connecting section 62 is disposed between the limitation arms 70, and are jointed to the case 12.

These limitation arms 70 will constrain the opening 69 of the temporal holding section 63 from turning and thus constrain the airbag 15 from unfolding and deploying, without hindering the unconnected hem 67 of the temporal holding section 63, which is opposed to the base region 64, from being deformed, that is, without hindering the folded region 57 from unfolding. Therefore, the limitation arms 70 will be suitable for an instance where a stronger constraint of airbag deployment is desired.

Figure 21:
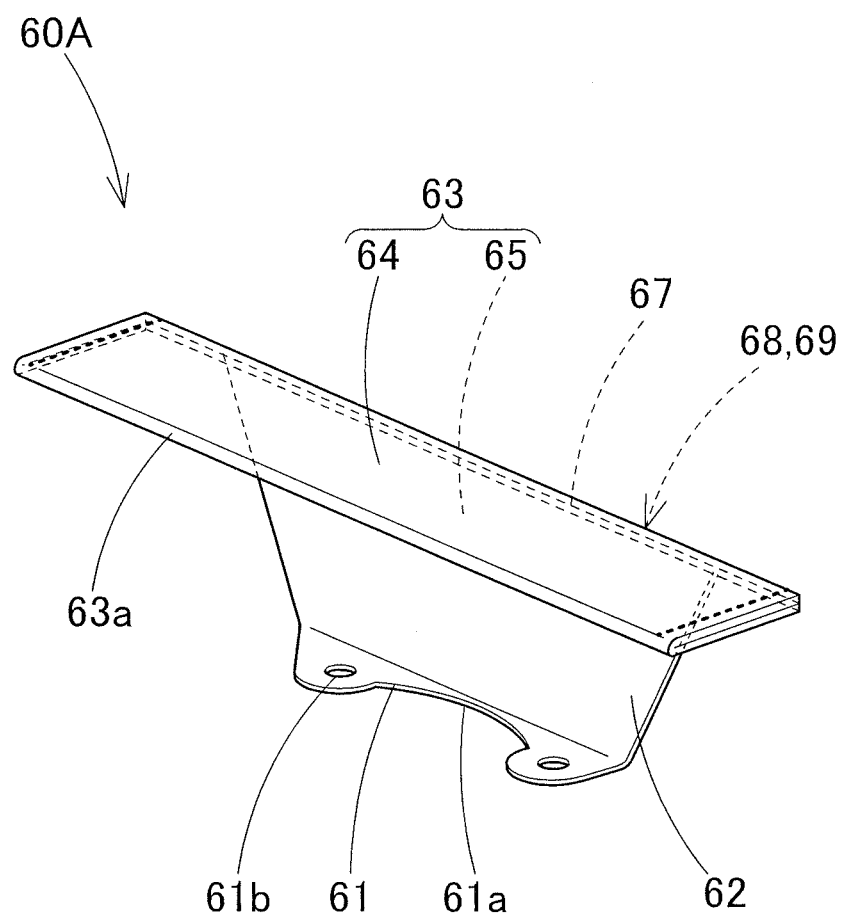
FIG. 21 is a perspective view of a modification of the limitation member.
Figure 22A:
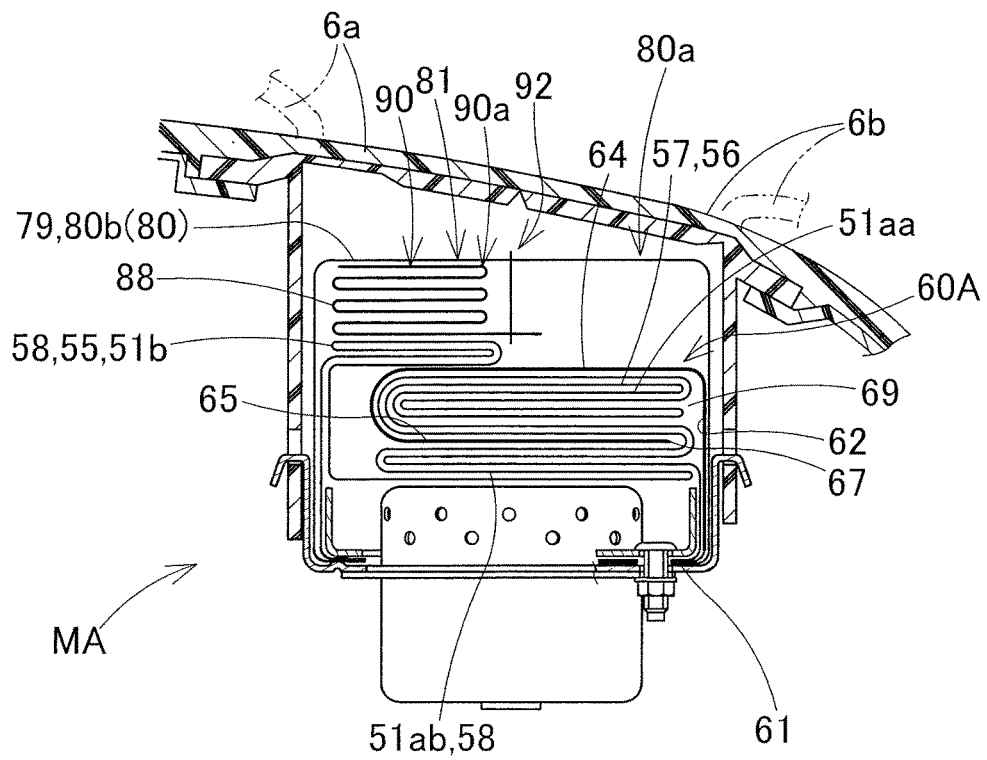
FIGS. 22A, 22B, 23A and 23B illustrate an inflating behavior of the airbag of the airbag device for a front passenger seat provided with the limitation member of FIG. 21.
Figure 22B:
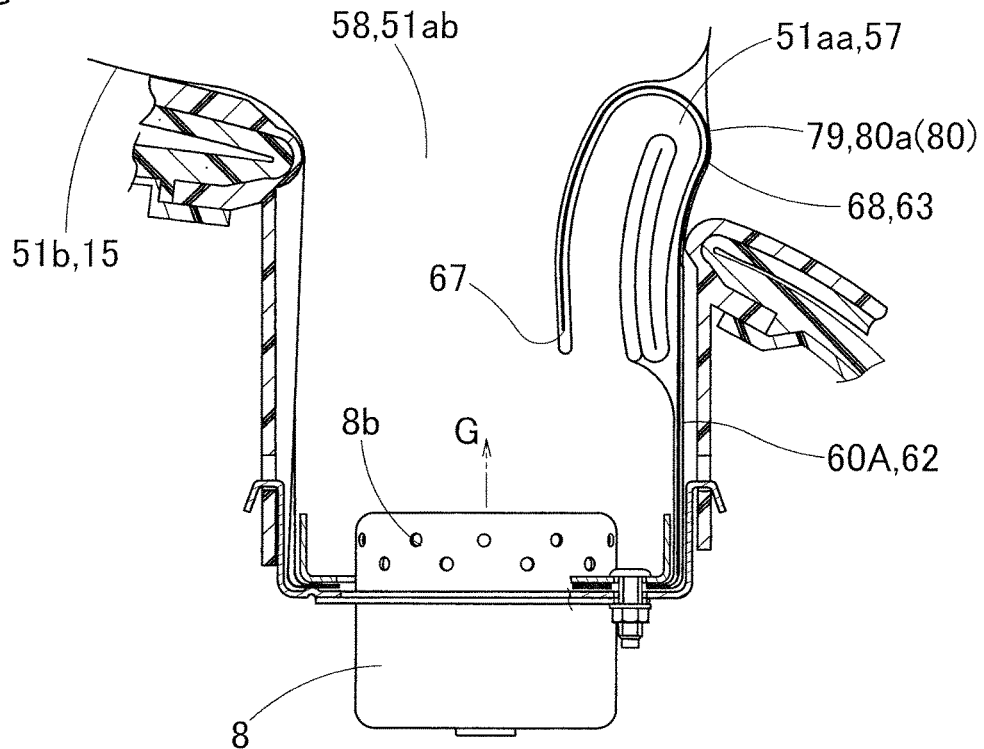
Figure 23A:
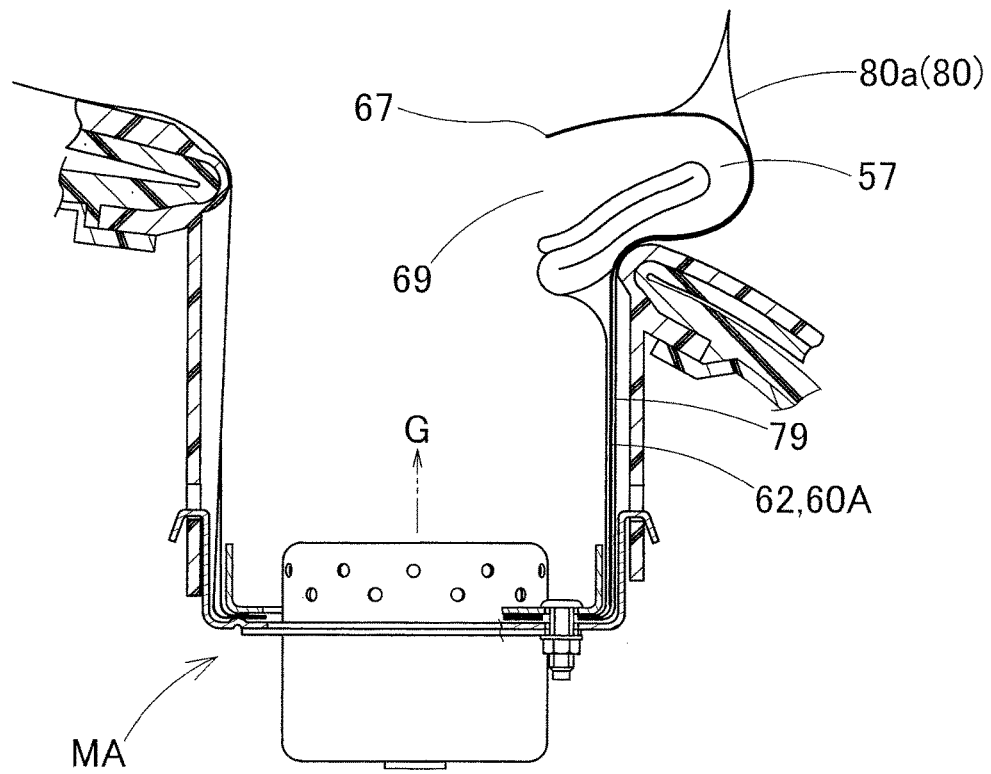
Figure 23B:
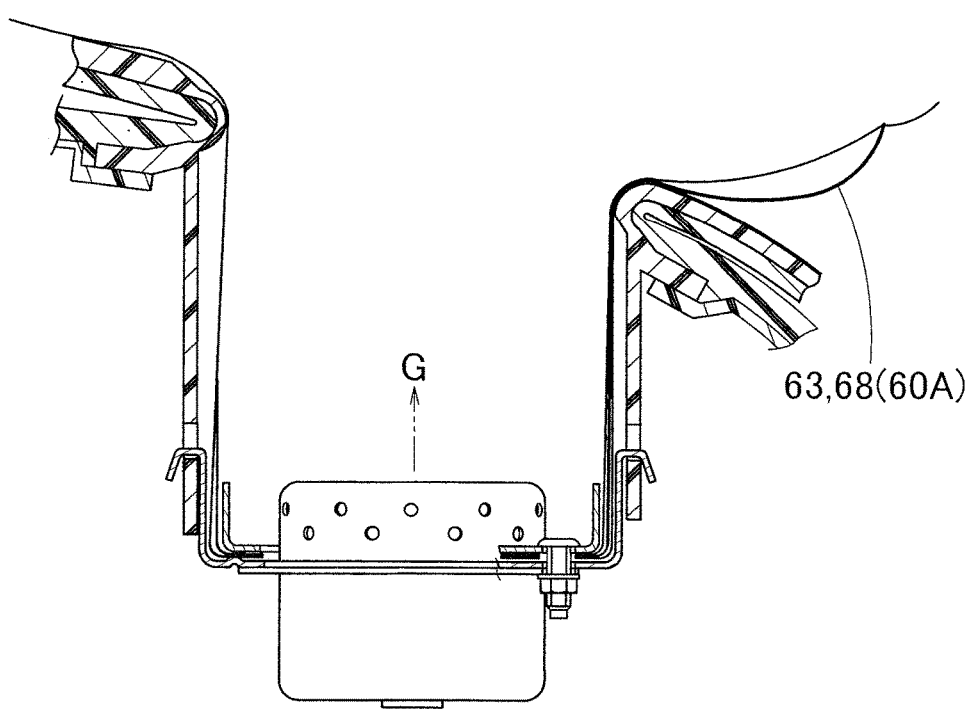
Figure 24:
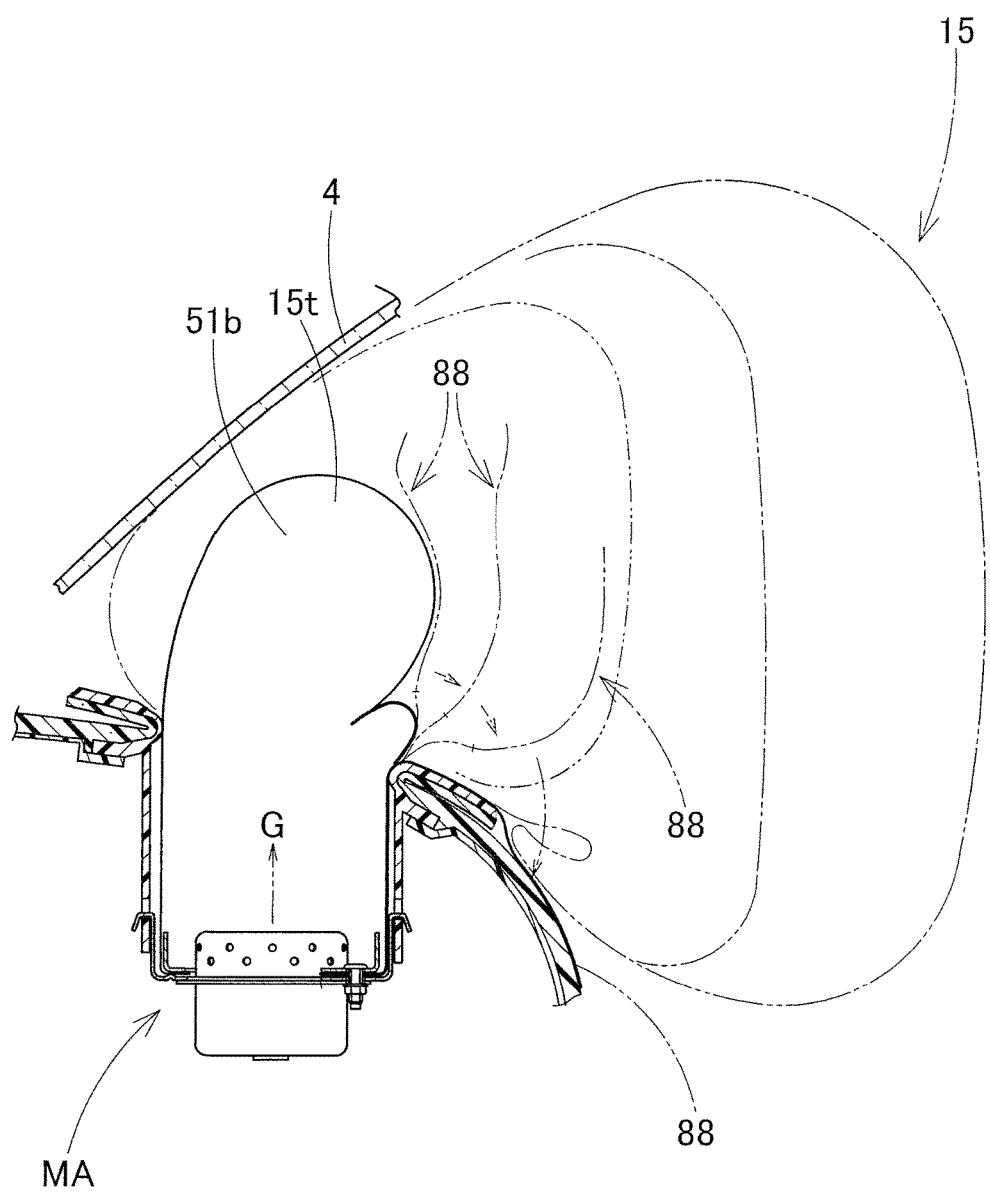
FIG. 24 schematically illustrates the inflating behavior of the airbag of the airbag device provided with the limitation member of FIG. 21.

Alternatively, the limitation member may be formed without such limitation arms 70, as in a limitation member 60A shown in FIG. 21. The limitation member 60A has a similar configuration to the limitation member 60 of the foregoing embodiment except in not including the limitation arms 70. Therefore, in the following description, common regions will be assigned the same reference numerals as in the foregoing embodiment, and will not be described in detail.

An airbag device MA which employs the limitation member 60A is composed of similar members and parts to the foregoing embodiment except the limitation member 60A. Its airbag 15 is folded up and stored in the case 12 in a similar fashion to the foregoing embodiment. Therefore, in the following description, common members and parts will be assigned the same reference numerals as in the foregoing embodiment, and will not be described in detail.

FIGS. 22A to 24 depict a deployment behavior of the airbag 15 of the airbag device MA. Unlike the airbag device M, in which the limitation member 60 includes the limitation arms 70, the temporal holding section 63 of the limitation member 60A will be turned quickly due to the deformation of the connecting section 62, open the opening 69 and release the folded region 57 of the airbag 15 quickly since there is no constraint by the limitation arms 70. That is, the constraint of unfolding and deploying of the airbag 15 is a little weaker than the airbag device M of the foregoing embodiment.

However, the airbag device MA with no limitation arms 70 will be still capable of constraining the airbag 15 from deploying temporarily and freeing it from constraint thereafter smoothly to attain a desired inflated state of the airbag 15 in an initial stage of airbag deployment.

Figure 25:
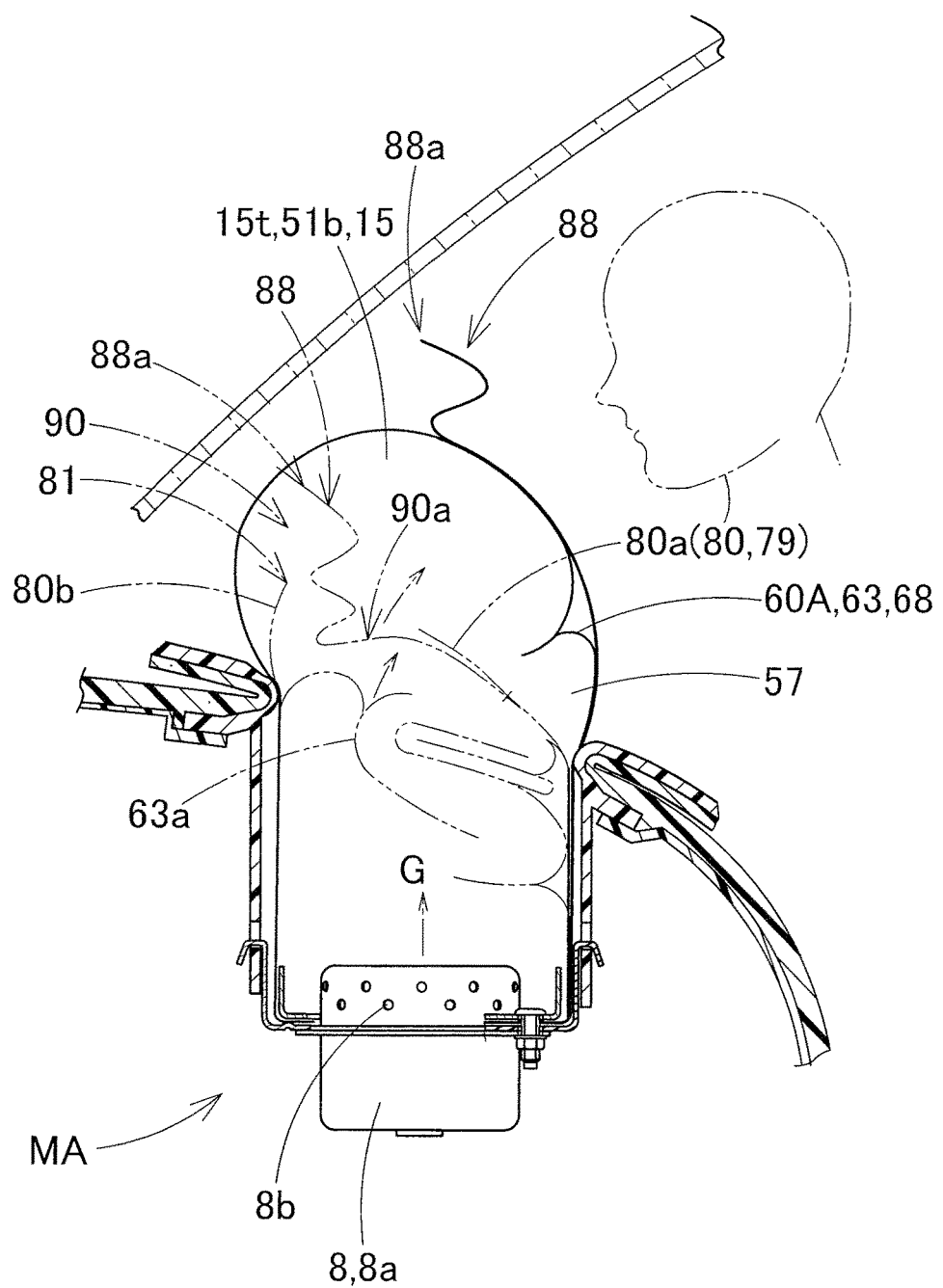
FIGS. 25, 26 and 27 illustrate a deployment behavior of a flap member against an abnormally-seated vehicle occupant at airbag deployment in the airbag device provided with the limitation member of FIG. 21.
Figure 26:
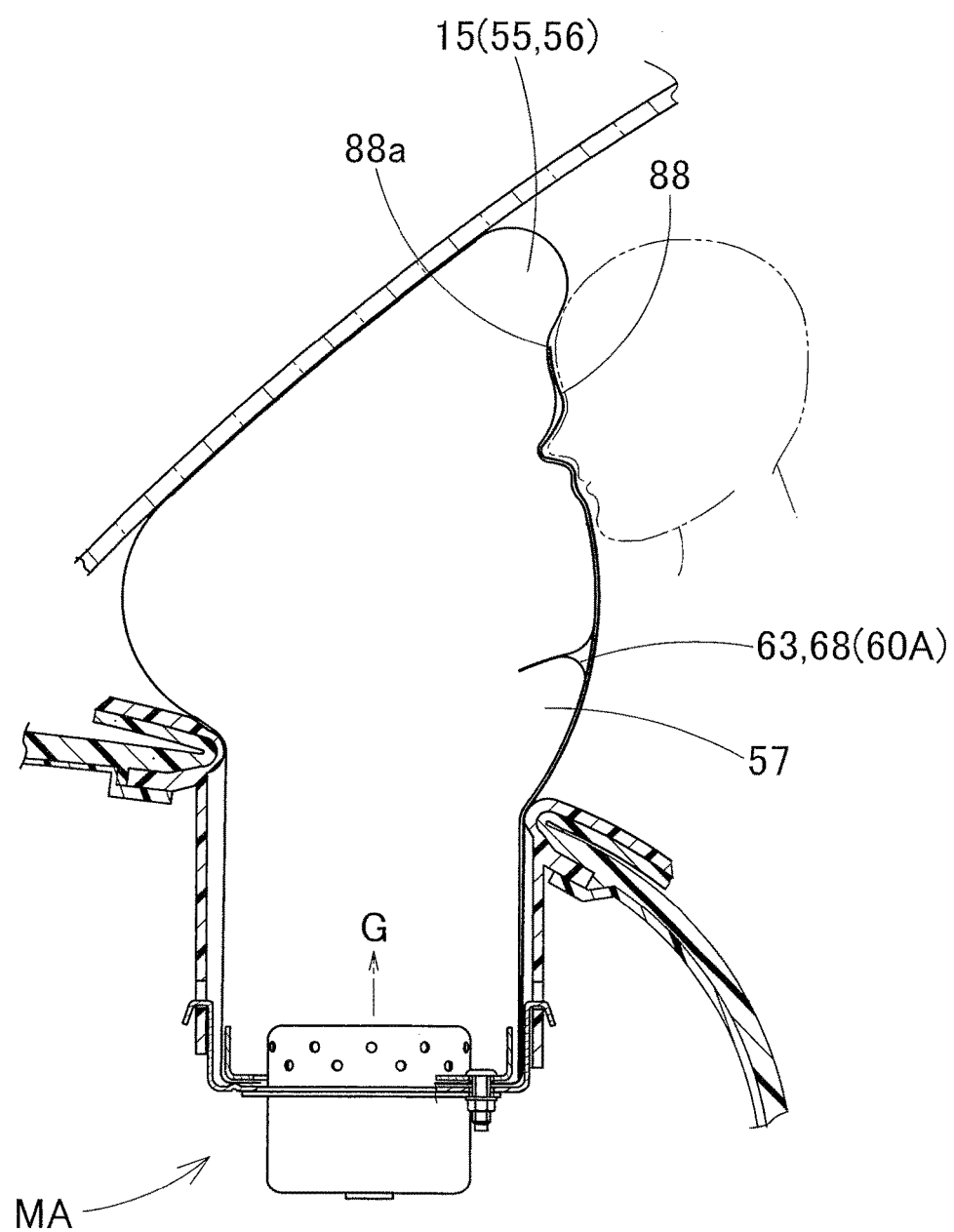
Figure 27:
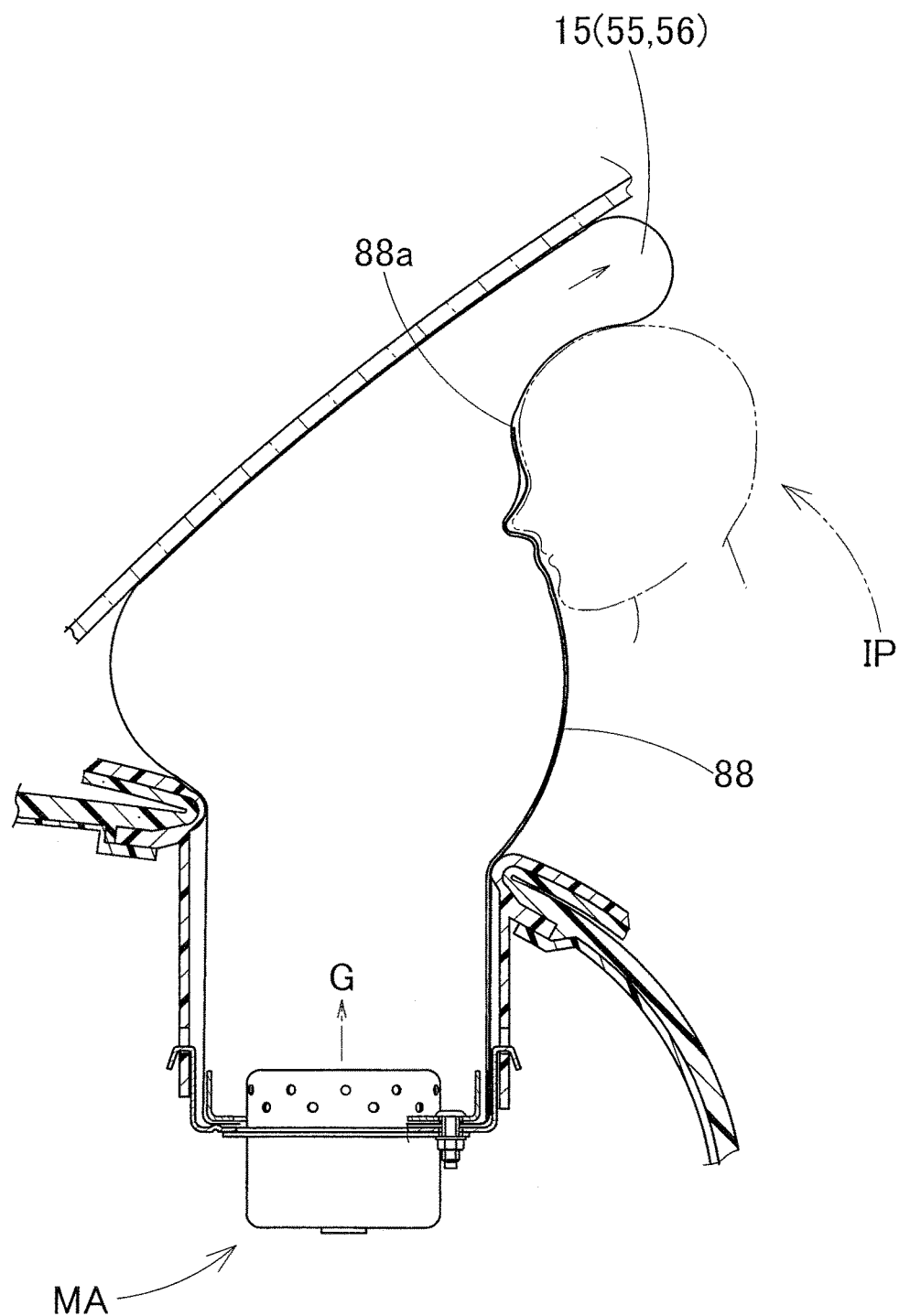

In the airbag device MA, the flap member 88 is mounted on the rear region 80*a* of the top section 80 of the wrapping member 79 with the seam 92, and the severalfold region 90 is disposed on the area of the front region 80*a* of the top section 80, in a similar fashion to the airbag device M of the foregoing embodiment. If, the passenger is located too close to the airbag device MA, the leading end region 88*a* of the flap member 88 will be brought into contact with the passenger IP and cover the passenger IP, and redirect the course of deployment of the airbag 15 upward or the like as shown in FIGS. 25 to 27, such that a pressure which would otherwise be given to the abnormally-seated passenger IP will be reduced and the abnormally-seated passenger IP will be protected in an adequate fashion. If the passenger PP is seated at a normal position, the leading end region 88a of the flap member 88 will complete deployment without contacting the passenger PP, and the airbag 15 will also be inflated and deployed smoothly without being constrained by the flap member 88 as shown in FIG. 1, although the airbag 15 will be subjected to constraint by the limitation member 60. Therefore, the normally-seated passenger PP will be protected in a suitable fashion.

The airbag device M and airbag device MA have been described as an airbag device for a front passenger seat which is mounted inside the top plane 2 of the instrument panel 1 in front of the front passenger seat, and are so configured that the folded region 57 of the airbag 15 which is temporarily held by the temporal holding section 63 of the limitation member 60 is a part of the rear region 56 of the airbag 15.

With this configuration, at airbag deployment, the constraint by the temporal holding section 63 of the limitation member 60 will delay the deployment of the folded region 57 (i.e., the rear region 56), and accordingly delay the deployment of a front region 55 of the folded-up body 53 as well. In an airbag device for a front passenger seat, the front region 55 of the folded-up body 53 is usually a region to be deployed towards the windshield 4 in an initial stage of airbag deployment, namely an initial protruding region 15t. That is, the above configuration will help constrain the deployment of the initial protruding region 15t, thus prevent the region 15t from hitting the windshield 4 forcefully.

However, the application of the present invention should not be limited to an airbag device for a front passenger seat. The present invention can also be applied to an airbag device adapted to be mounted on a steering wheel, a side airbag device adapted to be mounted on a side of a vehicle seat, a knee-protection airbag device or the like.

What is claimed is:

1. An airbag device adapted to be mounted on a vehicle, comprising:
   an airbag that is stored in and held by a housing in a folded-up configuration and is inflatable and deployable out of the housing for protecting a vehicle occupant when fed with an inflation gas;
   a limitation member that has flexibility and is mounted on a folded-up body, which refers to a folded-up configuration of the airbag, inside the housing for temporarily constraining a part of the airbag from unfolding and deploying, the limitation member comprising:
     a temporal holding section that temporarily holds a folded region, which is a part of the airbag, in a releasable fashion;
     a mounting section that is secured to the housing; and
     a connecting section that connects the temporal holding section and the mounting section;
   a wrapping member that wraps, in a tearable fashion, the folded-up body and the limitation member for keeping the folded-up configuration of the airbag; and
   a flap member that is mounted to a vicinity of the housing and disposed between the limitation member and the wrapping member inside the housing, the flap member being so deployable as to reach a vehicle occupant situated too close to the housing and cover the occupant from the airbag being deployed,
   wherein
   the temporal holding section of the limitation member comprises:
     a base region which is connected with the connecting section;
     a cover region which is connected with the base region; and
     a holding recess which is formed between the base region and the cover region so as to lodge the folded region of the airbag temporarily, the holding recess includes an opening out of which the folded region is freed from constraint, the opening being disposed at an inner periphery of an unconnected hem of the cover region which is not connected with the base region.

2. The airbag device of claim 1, wherein the flap member is mounted on the housing through the medium of the limitation member or the wrapping member by being joined to the limitation member or the wrapping member by a mounting region of the flap member.

3. The airbag device of claim 1, wherein:
   the folded-up body is held by the housing on a bottom surface thereof;
   the folded region of the airbag held by the limitation member temporarily is disposed in a vicinity of a top surface of the folded-up body;
   the mounting section of the limitation member is disposed on the bottom surface of the folded-up body;
   the connecting section of the limitation member is disposed on a side of the folded-up body;
   the temporal holding section of the limitation member is so disposed that the base region is disposed in a vicinity of the top surface of the folded-up body while the cover region is disposed closer to the bottom surface of the folded-up body than the base region;
   the flap member includes a severalfold region which is formed by folding a leading end region of the flap member, which is deployable towards the vehicle occupant, in layers; and
   a length of the flap member between a mounting region thereof to the vicinity of the housing and a root region of the severalfold region is longer than a length of the limitation member between the mounting section and a leading end of the temporal holding section such that the root region of the severalfold region is dislocated outward of the leading end of the temporal holding section and is allowed to move at airbag deployment.

4. The airbag device of claim 3, wherein:
   the connecting section of the limitation member is disposed on the side of the folded-up body facing towards a deployment direction of the airbag;
   the wrapping member includes, in a vicinity of a center of a top section thereof disposed over the top surface of the folded-up body, a tearable region that is formed along a width direction of the connecting section of the limitation member and is tearable at airbag deployment;
   the flap member is mounted on the housing through the medium of the limitation member or the wrapping member by being joined to the limitation member or the wrapping member by the mounting region;
   the flap member is joined to the limitation member or the wrapping member at an area disposed towards the connecting section of the limitation member with respect to the tearable region of the wrapping member, on the top surface of the folded-up body; and the severalfold region of the flap member is disposed on an opposite side of the mounting region with respect to the tearable region on the top surface of the folded-up body.

5. The airbag device of claim 1, wherein:

the limitation member further includes a pair of limitation arms that constrain the folded region of the airbag from unfolding and deploying in an initial stage of airbag deployment; and the limitation arms extend from opposite edges of the temporal holding section in such a manner that the connecting section is disposed between the limitation arms, and are jointed to the housing.

6. The airbag device of claim 1, wherein:

the airbag device is configured to be mounted inside a top plane of an instrument panel disposed below a windshield; and the folded region of the airbag which is temporarily held by the temporal holding section of the limitation member is a part of a rear region of the airbag.

* * * * *